United States Patent [19]
Bingham et al.

[11] Patent Number: 4,503,204
[45] Date of Patent: * Mar. 5, 1985

[54] SOLUTION POLYMERIZATION

[75] Inventors: Robert E. Bingham, Cuyahoga Falls; Richard R. Durst, Stow; Hubert J. Fabris, Akron; Ivan G. Hargis, Tallmadge; Russell A. Livigni; Sundar L. Aggarwal, both of Akron, all of Ohio

[73] Assignee: The General Tire & Rubber Company, Akron, Ohio

[*] Notice: The portion of the term of this patent subsequent to Nov. 24, 1998 has been disclaimed.

[21] Appl. No.: 466,399

[22] Filed: Feb. 15, 1983

Related U.S. Application Data

[63] Continuation of Ser. No. 319,820, Nov. 9, 1981, abandoned, and a continuation-in-part of Ser. No. 124,373, Feb. 25, 1980, Pat. No. 4,302,568.

[51] Int. Cl.³ ............................................. C08G 12/00
[52] U.S. Cl. .................................... 526/187; 526/340; 525/98; 525/99
[58] Field of Search .................. 526/187; 525/314, 98, 525/99

[56] References Cited

U.S. PATENT DOCUMENTS

| 3,953,543 | 4/1976 | Futamura et al. | 526/87 |
| 4,080,492 | 5/1978 | de Zarauz | 526/335 |
| 4,110,525 | 8/1978 | de Zarauz | 526/187 |
| 4,116,917 | 9/1978 | Eckert | 526/335 |

FOREIGN PATENT DOCUMENTS 2030995  4/1980  United Kingdom .

Primary Examiner—Joseph L. Schofer
Assistant Examiner—Peter F. Kulkosky

[57] ABSTRACT

A composition useful as a catalyst in solution polymerization comprises (1) a barium, calcium and/or strontium alcoholate, (2) an organoaluminum compound and (3) an organomagnesium compound. (2) and (3) may be used as a complex with (1). The compositions can be used to polymerize ethylenically unsaturated monomers like butadiene, butadiene and styrene, and isoprene and heterocyclic monomers like oxiranes, thiiranes, siloxanes, thiatanes and lactams. The catalyst composition can produce polybutadienes and butadiene-styrene copolymers having a trans-1,4 content as high as 90%. The non-terminating features of the polymerization of this invention permit the preparation of functionally terminated butadiene based polymers and block polymers containing sufficient amounts of trans-1,4 butadiene units to crystallize.

32 Claims, 14 Drawing Figures

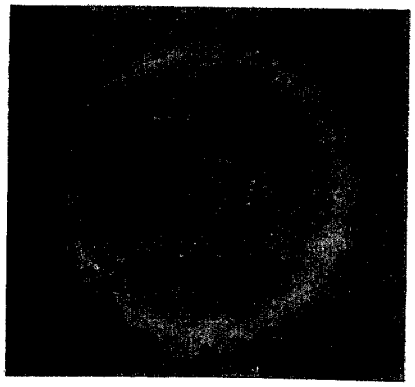
FIG. 6A    0%
FIG. 6B    200%
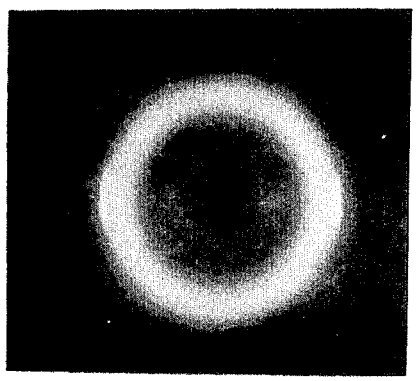
FIG. 6C    700%
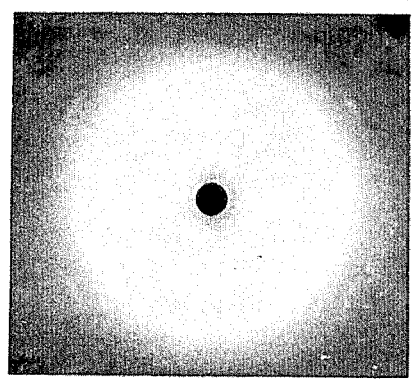
FIG. 6D    700%

SOLUTION POLYMERIZATION

This is a continuation of application Ser. No. 319,820 filed Nov. 9, 1981 now abandoned.

This application is a continuation-in-part of prior copending patent application Ser. No. 124,373 filed Feb. 25, 1980, now U.S. Pat. No. 4,302,568, granted Nov. 24, 1981.

This invention relates to compositions of (1) barium, calcium and/or strontium alcoholates, (2) organoaluminum compounds and (3) organomagnesium compounds and their use as catalysts for the solution polymerization of ethylenically unsaturated monomers like butadiene, butadiene/styrene and isoprene and for the polymerization of heterocyclic monomers like oxiranes, thiiranes, siloxanes, thiatanes and lactams.

BACKGROUND OF THE INVENTION

The use of dialkylmagnesium or alkylmagnesium iodide in combination with barium ethoxide particularly additionally with 1,1-diphenylethylene as initiators of polymerization of butadiene to give polybutadiene having a trans-1,4 content as high as 78% and a vinyl content of 6% has been disclosed by the Physico-Chemical Research Institute, Polymer Science U.S.S.R., 18 (9), 2325 (1976). This paper, also, shows that a catalyst system of magnesium and barium tert-butoxide gave a polybutadiene with only 45% trans-1,4 content (200 hours polymerization time and conversion of only 10%).

U.S. Pat. No. 3,846,385 (U.S. Pat. No. 3,903,019 is a division of the same) shows the preparation of random butadiene-styrene copolymers having a high trans-1,4 content and a vinyl content of 9%. The trans-1,4 content increased as the mol ratio of $Ba(t\text{-}BuO)_2/(Bu)_2Mg$ decreased with little variation in either the vinyl content or heterogeneity index. A copolymer exhibited a well defined crystalline melting temperature at 32.6° C. by differential thermal analysis (DTA). The Molecular Weight Distribution (MWD) of these copolymers was characterized by having heterogeneity indices ($\overline{M}_w/\overline{M}_n$) ranging from 1.4 to 2.2. Polybutadienes made with these catalysts exhibited a trans-1,4 content as high as 78%. No polymerization or copolymerization occurred when only one of the catalyst components was used alone.

Polymerization of buadiene with some cyclization in hexane or toluene at 100° C. using $Bu_2Mg\text{-}BuMgI$ is reported in "Chem. Abstracts," 1963, 4045e.

Polymerization of butadiene using $Ba(OEt)_2$ with $Et_2Mg$, $(C_4H_9)_3Mg_2I$ or $(C_6H_{13})_2Mg$ is reported in "Chem. Abstracts," Vol. 84, 1976, 151067n.

Dialkylmagnesium compounds and their complexes with organoaluminum or with organolithium compounds are said to be cocatalysts with Ziegler based catalyst systems (transition metal compounds) for the polymerization of dienes and olefins. This has been described by Texas Alkyls (Product Data Sheet MAGALA-6E) and Lithium Corporation of America (Product and Technical Bulletin on "Polymerization Using Magnesium Alkyl Catalysts," 1978).

British Patent No. 1,531,085 discloses in the working examples the preparation of polybutadienes and butadiene-styrene copolymers having inherent viscosities of 0.8 to 5, trans-1,4 contents of 34 to 90% and vinyl contents of 2 to 38%. A two component catalyst is used. As shown by the working examples the first component can comprise a $Ba[Al(C_2H_5)_4]_2$, $Ba[Al(C_2H_5)_3OR]_2$ where R is a nonyl phenate radical, $LiAl(C_2H_5)_4$, $NaAl(C_2H_5)_4$, $KAl(C_2H_5)_4$, $LiAl(C_2H_5)_3OCH(CH_3)_2$, $LiOAl(C_2H_5)_2$ compound and so forth. The second component is a polar compound or the like such as tetrahydrofuran, methanol, water, tetramethylethylene diamine, acetone, barium nonyl phenate, lithium isopropylate, Na-tert-amylate, acetonitrile and so forth. The molar ratio between the polar compound and the organic compound of metal of Group IIIA such as Al is from 0.01 to 100.

U.S. Pat. No. 4,079,176 discloses a process for polymerizing dienes and for copolymerizing dienes and vinyl aromatic compounds with a catalyst composition comprising (A) an organolithium and (B) a compound having the formula

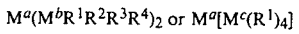

$$M^a(M^bR^1R^2R^3R^4)_2 \text{ or } M^a[M^c(R^1)_4]$$

where $M^a$ is Ba, Ca, Sr or Mg; $M^b$ is B or Al; $M^c$ is Zn or Cd; $R^1$, $R^2$ and $R^3$ are alkyl or aralkyl radicals; $R^4$ is an alkyl, aralkyl radical or $OR^5$ where $R^5$ is an alkyl or aralkyl radical. The working examples show the polymerization of BD and copolymerization of BD with STY to provide polymers exhibiting intrinsic viscosities of 0.81 to 1.6, trans-1,4 contents of 76 to 85% and vinyl contents of 2 to 6%.

U.S. Pat. No. 4,080,492 discloses a method for polymerizing BD or copolymerizing BD and vinyl aromatic compounds using a catalytic composition of (a) an organolithium compound and (b) a cocatalyst system which comprises a Ba or Sr compound and an organometallic compound from Groups IIB or IIIA like zinc or aluminum. Examples of the Ba or Sr compounds are their hydrides, organic acid salt, alcoholates, thiolates, phenates, alcohol and phenol acid salts, betadiketonates and so forth. Table VIIA shows the use of barium tertiobutanolate. Examples of the Group IIB and IIIA materials are diethylzinc, diethyl cadmium, triethyl aluminum and so forth. The working examples for the preparation of polymers of BD and copolymers of BD and STY show $\eta$ of 0.34 to 2.15, trans-1,4 of 61 to 90% and vinyl contents of 2.4 to 9%.

U.S. Pat. No. 4,092,268 is similar to U.S. Pat. No. 4,080,492 but it includes isoprene and shows in Examples 11 and 12 the polymerization of isoprene and the copolymerization of isoprene and styrene.

British Pat. No. 1,516,861 has a somewhat similar disclosure to that of U.S. Pat. No. 4,080,492 and both are based on the same French patent application. The U.S. case apparently deleted reference to the polymerization of isoprene.

British Pat. No. 1,525,381 (patent of addition to Br. Pat. No. 1,516,861, above) discloses a process for polymerizing butadiene and copolymerizing butadiene and styrene using a catalyst composition of (a) an organolithium, (b) a compound of barium, strontium or calcium, (c) an organometallic compound of a metal of Group IIB or IIIA and (d) an amino or ether alcoholate of an alkali metal. An example of (a) is n-butyl lithium; of (b) is Ca, Ba or Sr alcoholate or phenate particularly barium nonyl phenate; of (c) is $(C_2H_5)_2Zn$, $(C_2H_5)_3Al$ or $(i\text{-}butyl)_3Al$; and of (d) is $C_2H_5(OCH_2CH_2)_2OLi$, $(C_2H_5)_2NCH_2CH_2OLi$ or $CH_2(OCH_2CH_2)_2ONa$.

The working examples for the polybutadienes and butadiene-styrene copolymers made show inherent viscosities of 0.9 to 2.4, trans-1,4 contents of 80 to 90% and vinyl contents of 2 to 4%. For Example 2 it is stated that the green strength test on the black loaded uncured copolymers showed a similar resistance to elongation to that of natural rubber.

A class of crystallizing elastomers based on butadiene containing sufficient amounts of the trans-1,4 structure to crystallize has been disclosed in U.S. Pat. No. 3,992,561 (divisional U.S. patents of the same, U.S. Pat. Nos. 4,020,115; 4,033,900 and 4,048,427 have the same disclosure in the specification). The catalyst for the preparation of these polymers comprises an alkyl lithium compound such as n-butyl lithium and a barium t-alkoxide salt such as a barium salt of t-butanol and water. The polymerization temperature, the nature of the solvent and the mole ratio of the catalyst components and its concentration were found to control the polybutadiene microstructure and molecular weight. It is stated that the crystalline melting temperature of the high trans polybutadienes can be depressed near or below room temperature by the copolymerization of styrene, still permitting the rubber to undergo strain induced crystallization. The butadiene polymers and butadiene-styrene copolymers exhibited green strength and tack strength. A high trans polybutadiene exhibited a broad bimodal molecular weight distribution. This patent discloses in the working examples for the invention polybutadiene and butadiene-styrene copolymers exhibiting intrinsic viscosities of 1.43 to 7.39, trans-1,4 contents of 63 to 80.4% and vinyl contents of 6 to 9%.

U.S. Pat. No. 4,260,712 (U.S. Pat. No. 4,260,519 is a division), discloses an improved barium t-alkoxide salt for use with a hydrocarbon lithium compound for the preparation of polybutadiene and butadiene-styrene copolymers. It shows in the working examples for polybutadiene and butadiene-styrene copolymers intrinsic viscosities of from 3.74 to 7.68, trans-1,4 contents of 73 to 82% and vinyl contents of 6 to 13%.

"Gummi-Asbest-Kunststoffe," pages 832 to 842, 1962 reviews several catalyst systems for polymerizing unsaturated monomers and discusses the properties of several polymers. On page 835, Table 4, it discloses the use of a catalyst system of $R_2Mg$ and $RMgHal$ to polymerize butadiene to make a polybutadiene having 45–49 trans-1,4 units.

OBJECTS

An object of the present invention is to provide a new composition useful as a catalyst for the solution polymerization of ethylenically unsaturated monomers and heterocyclic monomers.

Another object of the present invention is to provide a method for solution polymerization of ethylenically unsaturated monomers and heterocyclic monomers using an anionic catalyst complex or composition.

These and other objects and advantages of the present invention will become more apparent from the following detailed description, examples and accompanying drawings in which FIG. 1 is a graph showing copolymer composition variation with percent conversion using different catalyst systems;

FIG. 6 shows x-ray diffraction patterns for a high trans styrene-butadiene rubbery copolymer (about 15% Sty; 85% Trans) of this invention;

SUMMARY OF THE INVENTION

According to the present invention a composition of a barium alcoholate or alkoxide salt, an organoaluminum compound and an organomagnesium compound has been found useful as an anionic polymerization catalyst for the solution polymerization of butadiene as well as butadiene and styrene to make polymers having a high trans content. In place of barium alkoxide, calcium alkoxide or strontium alkoxide can be used. The catalyst may be used for the polymerization of other ethylenically unsaturated monomers as well as heterocyclic monomers like oxiranes, thiiranes, siloxanes, thiatanes and lactams.

The homopolymer of butadiene and copolymer of butadiene with styrene of this invention have a high content of trans-1,4 linkages (85–90%) and a low vinyl content (2–3%) which provide sufficient amounts of trans-1,4 polybutadiene placements to permit crystallization. The catalyst for these polymerizations comprises an organomagnesium-organoaluminum complex, (1) [(a)alkyl$_2$Mg:(b)alkyl$_3$Al], where the mole ratio of (a) to (b) is from about 105/1 to 1.5/1, in combination with, (2) a barium, calcium and/or strontium (barium being preferred) salt of alcohols, or alcohols and water, the alcohol is preferably a tert-alcohol, the mole ratio of barium metal to magnesium metal being from about 1/10 to 1/2.

It has been found that the trans-1,4 content of the polybutadiene segments generally is controlled by the following factors: (1) the mole ratio of barium to magnesium ($Ba^{2+}/Mg^{2+}$) present in the Mg alkyl-Al alkyl-Ba salt catalyst composition, (2) the mol ratio of Mg to Al, (3) the nature of the polymerization solvent used, (4) the polymerization temperature, and (5) the catalyst concentration. By the use of appropriate polymerization variables, the trans-1,4 content is sufficiently high (ca 81 to 90%) to provide a crystalline polybutadiene and for certain copolymer compositions (with styrene contents up to about 30%) a strain-crystallizing SBR and $\overline{M}n$ about 50,000 to 500,000, linear and branched.

Figure 1:
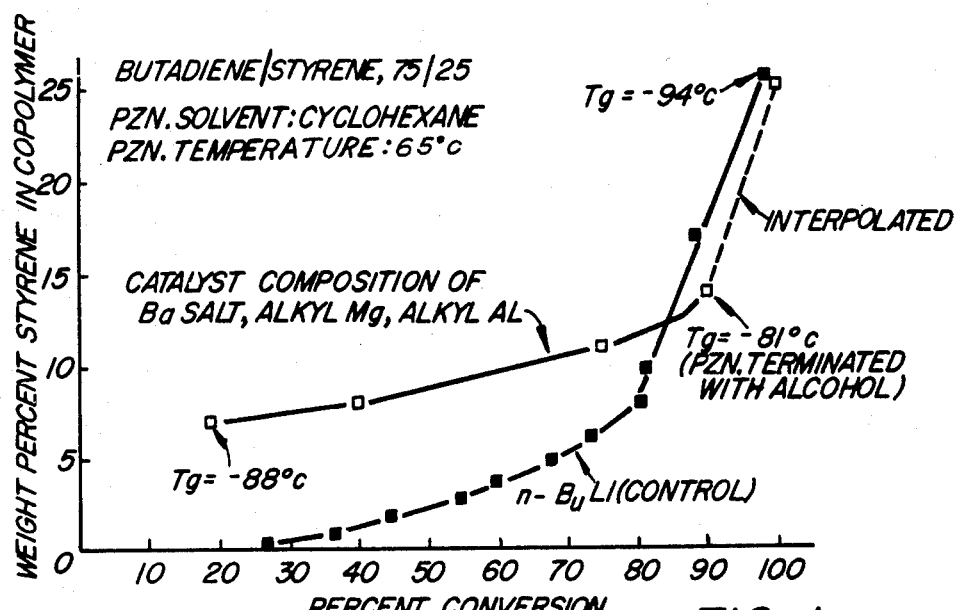

Copolymerization of butadiene and styrene with barium t-alkoxide salts and a complex of an organomagnesium with an organoaluminum (Mg-Al), for example, 5.4 $(n-C_4H_9)_2Mg \cdot (C_2H_5)_3Al$ (MAGALA-6E, Texas Alkyls, Inc.) exhibits a higher initial rate of incorporation of styrene than a $n-C_4H_9Li$ catalyzed copolymerization as shown by FIG. 1.

Proton NMR analysis of these high trans SBR's (15% styrene) shows a distribution of the styrene throughout the polymer from isolated units to styrene sequences longer than tetrads. The amount of block polystyrene placements in the copolymer chain appears to rapidly increase as the extent of conversion increases from 90% to 100%. However, it has not been possible to isolate any polystyrene from the products of oxidative degradation with tert-butylhydroperoxide and osmium tetroxide [following the technique of I. M. Kolthoff, T. S. Lee and C. W. Carr, J. Polymer Sci., 1, 429 (1946)] of a high trans SBR polymerized to 92% conversion and containing 23 weight percent (wt.%) total styrene.

Figure 2:
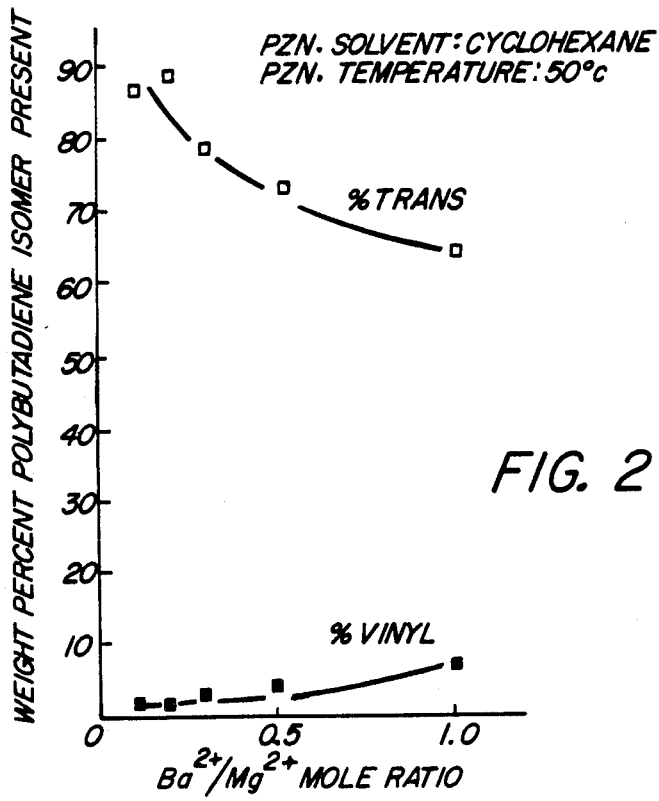
FIG. 2 is a graph showing the polybutadiene microstructure versus the mole ratio of $Ba[(t-RO)_{2-x}(OH)_x]$ to $(Bu)_2Mg$ at $Mg/Al=5.4/1$ (Example 1)

One of the main factors which controls the butadiene microstructure at constant Mg/Al ratio is the mole ratio of $Ba^{2+}/Mg^{2+}$. This is shown by FIG. 2 for a Mg/Al ratio of 5.4/1. The trans-1,4 content of polybutadiene, prepared in cyclohexane at 50° C., increases and the vinyl content decreases as $Ba^{2+}/Mg^{2+}$ decreases. Polybutadienes with trans-1,4 contents as high as 90% with vinyl contents of 2% have been prepared with this system at mole ratios of $Ba^{2+}/Mg^{2+}$ of 1/5. The optimum $Ba^{2+}/Mg^{2+}$ ratio is approximately 1/5.

In particular, complexes of Mg-Al with compounds of barium tert-alkoxide or barium (tert-alkoxide-hydroxide) are highly effective for the preparation of high trans-1,4 polybutadiene (up to about 90% trans). The barium salts useful in the polymerization are prepared in liquid monomethylamine or liquid ammonia by reacting barium metal with a tert-alcohol or mixture of t-alcohols, or mixture of tert-alcohol(s) and water (0.01-0.1 equivalents of the available barium is reacted with water). Certain barium salts, such as barium (tert-decoxide-tert-butoxide-hydroxide), molar ratio of tert-decanol/tert-butanol/$H_2O$ (30/59/11), have the advantage that they are soluble to greater than 20 wt.% in toluene and the solutions are stable indefinitely. Thus, they provide a soluble barium compound of invariant solution composition during storage.

Complexes of barium tert-butoxide (which is only sparingly soluble (0.1 wt.%) in toluene at room temperature) with Mg-Al alkyls are, however, also effective catalysts for the preparation of 90% trans-1,4 polybutadienes.

The polymerization activity and the amount of trans-1,4 content are very much dependent on the Mg/Al ratio in these Ba-Mg-Al catalysts. It has been found that Mg-Al complexes containing $(n-C_4H_9)_2Mg$ to $(C_2H_5)_3Al$ in mole ratios of about 5.4 and 7.6 (MAGALA-6E and MAGALA-7.5E, Texas Alkyls, Inc.), respectively, are effective for preparing 90% trans-1,4 polybutadiene at constant Ba/Mg=0.20. In addition, Mg-Al-Ba complexes containing Mg and Al in ratios of 27 and 105 are capable of polymerizing butadiene to polymers having trans-1,4 contents of about 81–83%. However, a complex of $(n-C_4H_9)_2Mg \cdot 2(C_2H_5)_3Al$ with Ba salts did not polymerize butadiene.

It is possible to prepare polybutadiene with trans-1,4 contents greater than 85% with Ba-Mg-Al catalysts consisting of a complex of barium salts with (sec-$C_4H_9$)Mg (n-$C_4H_9$) and $(C_2H_5)_3Al$, prepared in situ, in mole ratios of Mg/Al ranging from about 2 to 7.6.

Alternatively, soluble catalyst compositions can be prepared by mixing clear colorless solutions of, e.g., MAGALA-6E in heptane with barium (tert-alkoxide-hydroxide) in toluene. Optionally, the catalyst can be preformed by heating the solution for 15 minutes at 60° C. A yellow colored solution forms upon heating, indicating complex formation ($Ba^{2+}/Mg^{2+}=1/5$). A small amount of lightly colored precipitate is also formed. Active catalyst components for trans-1,4 addition are present in the solution phase. The insoluble phase in toluene represents only a small fraction of the total metallic compounds.

In addition to the effect of catalyst composition, the nature of the polymerization solvent and temperature influence the microstructure of the butadiene based polymers. Polybutadienes prepared in paraffinic and cycloparaffinic hydrocarbon solvents have slightly higher trans-1,4 contents and higher molecular weights than polymers prepared in toluene. The stereoregularity of butadiene based polymers prepared in cyclohexane with a Mg-Al-Ba catalyst is dependent on polymerization temperature. The decrease in trans-1,4 content with increasing polymerization temperature occurred with a corresponding increase in both vinyl and cis-1,4 contents.

The concentration of catalyst affects both the trans-1,4 content and molecular weight of polybutadiene prepared in cyclohexane at 50° C. The trans-1,4 content increases non-linearly with a decrease in the molar ratio of the initial butadiene to $(n-C_4H_9)_2Mg$ concentration, at a constant Ba/Mg ratio. The trans-1,4 content appears to reach a limiting value of about 90% for polybutadienes prepared with relatively large amounts of catalyst.

Molecular weight increases with an increase in the molar ratio of butadiene to $(n-C_4H_9)_2Mg$ as well as with an increase in the extent of conversion. In addition, the viscosity of a solution of non-terminated polybutadienyl anion increases with the addition of more monomer. The above results demonstrate that a certain fraction of the polymer chain ends retain their capacity to add monomer.

The crystalline melting temperatures (45° C., 70° C.) of these polybutadienes can be decreased to near or below room temperature (about 25° C.) by adjustments of the trans-1,4 content and the incorporation of a comonomer (styrene). The resultant copolymers are then amorphous at room temperature but will undergo strain-induced crystallization. The rubbers are characterized by both green strength and tack strength equal to or higher than natural rubber. As such, these synthetic rubbers can be expected to be of value in those applications where natural rubber is used. One of these applications is as a tire rubber, especially in radial ply tire construction. In addition, the ability to control the molecular structure of these rubbers makes them useful materials in tire tread compounds.

For styrene-butadiene copolymers, prepared with Mg-Al-Ba catalysts at Ba/Mg of 0.20 to 0.25, the molecular weight appears to be controlled by both the level of Mg and Ba used in the polymerization. The molecular weight of high trans polybutadiene and polystyrene as well as STY-BD copolymers increases with an increase in initial molar concentrations of monomer(s)/Mg at constant Ba/Mg.

Discussion of Details and Preferred Embodiments

The barium (preferred), calcium or strontium alcoholate or alkoxide salt or mixture of such salt is made by reacting an alcohol, preferably a tertiary alcohol or mixture of tertiary alcohols, optionally additionally including water, with Ba, Ca and/or Sr. It is better to conduct the reaction in liquid $NH_3$ or amine solvent at a temperature of from about $-100°$ C. up to the boiling point of the solvent or above the boiling point under pressure. After the reaction, the $NH_3$ or amine can be removed from the salt by distillation, vacuum evaporation and solvent extraction. Preferably, the salt is dried in a vacuum at reduced pressure for a period of time sufficient to reduce the nitrogen content of the salt to not greater than about 0.1, preferably not greater than about 0.01%, by weight. Methods of making the barium alkoxide salts, such as barium t-alkoxide salts, which also will be applicable to the corresponding Ca and Sr salts, are shown in U.S. Pat. No. 3,992,561 and U.S. Pat. No. 4,260,712 (U.S. Pat. No. 4,260,519 is a division), the disclosures of which are incorporated herein and made a part hereof by reference to the same.

Examples of alcohols to use to make the Ba, Ca and/or Sr salts or alcoholates are methanol, ethanol, propanol, isopropanol, n-butanol, cyclopentanol, cycloheptanol, cyclohexanol, s-butanol, t-butanol, pentanol, hexanol, octanol, and decanol and so forth and mixtures of the same. Examples of such alcoholates are calcium diethoxide, di(t-butoxy) strontium, di(isopropoxy) barium, di(cyclohexyloxy) barium and so forth. If a non-tertiary alcohol or carbinol is used, it is preferred that the mixture contain at least 50 mol % of a tertiary carbinol.

The preferred carbinol to use is a tertiary carbinol, having the general formula

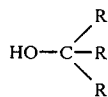

where the Rs are selected from the group consisting of alkyl or cycloalkyl radicals of from 1 to 6 carbon atoms which may be the same or different such as a methyl, ethyl, propyl, butyl, isopropyl, amyl, cyclohexyl and the like radicals. Examples of these tertiary carbinols are t-butanol, 3-methyl-3-pentanol, 2-methyl-2-butanol, 2-methyl-2-pentanol, 3-methyl-3-hexanol, 3,7-dimethyl-3-octanol, 2-methyl-2-heptanol, 3-methyl-3-heptanol, 2,4-dimethyl-2-pentanol, 2,4,4-trimethyl-2-pentanol, 2-methyl-2-octanol, tricyclohexyl carbinol, dicyclohexyl propyl carbinol, cyclohexyl dimethyl carbinol, t-decanol (4-n-propyl-heptanol-4), 3-ethyl-3-pentanol, 3-ethyl-3-hexanol, 3-ethyl-3-heptanol, 3-ethyl-3-octanol, 5-ethyl-5-nonanol, 5-ethyl-5-decanol, 6-ethyl-6-undecanol, 5-butyl-5-nonanol, 4-isopropyl-4-heptanol, 2-methyl-4-n-propyl-4-heptanol, 4-n-propyl-4-nonanol, 5-n-propyl-5-nonanol, 2,2-dimethyl-4-n-propyl-4-heptanol, 4-n-propyl-4-decanol, 5-n-propyl-5-decanol, 2,6-dimethyl-4-isobutyl-4-heptanol, 3,3,6-trimethyl-4-n-propyl-4-heptanol, 6-n-propyl-6-undecanol, 5-n-butyl-5-decanol, 6-n-butyl-6-undecanol, 6-n-pentyl-6-undecanol, 2,8-dimethyl-5-isopentyl-5-nonanol, and 2,8-dimethyl-5-isobutyl-5-nonanol and the like and mixtures of the same.

There, also, may be used a tertiary carbinol having the general formula

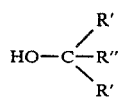

where R' is an alkyl radical of from 1 to 4 carbon atoms which may be the same or different and where R" is a hydrocarbon radical having a molecular weight of from about 250 to 5,000. These materials may be obtained by polymerizing in solvent media butadiene and/or isoprene with or without a minor amount of styrene and/or alpha methyl styrene using a monolithium hydrocarbon catalyst such as butyllithium to obain a liquid lithium terminated polymer or oligomer. The preparation of such liquid diene containing polymers is known. See U.S. Pat. No. 3,078,254. Appreciable amounts of catalyst are used to obtain liquid polymers. See U.S. Pat. No. 3,301,840. The resulting polymer solution is then treated with an epoxide such as isobutylene oxide

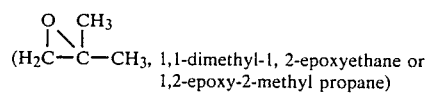

to obtain a product which may be shown as:

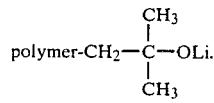

In place of isobutylene oxide there can be used 1,1-diethyl-1,2-epoxyethane, 1,1-dipropyl-1,2-epoxyethane, 1,1-diisopropyl-1,2-epoxyethane, 1,1-dibutyl-1,2-epoxyethane, 1,1-diisobutyl-1,2-epoxyethane and the like epoxide and mixture thereof. See U.S. Pat. No. 3,538,043. These epoxide treated lithium terminated polymers can then be hydrolyzed with water to form the tertiary carbinol or alcohol:

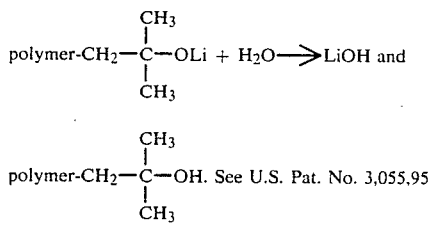

The hydrolyzed polymer or liquid tertiary carbinol is then removed from the organic solvent and is ready for reaction with barium to form a barium tertiary alkoxide salt.

Mixtures of the above tertiary carbinols can be used.

Water, if used in preparing the Ba, Ca or Sr alcoholates or salts, is employed in the alcohol or alcohol mixture as follows:

from about 0 to 20, preferably from about 0 to 12, mol% of water to from about 100 to 80, preferably from about 100 to 88, mol% of the alcohol or alcohol mixture.

The resulting preferred alcoholate or alkoxide salt, or mixture of said salts, preferably containing not over about 0.1%, and even more preferably not over about 0.01% by weight of nitrogen, have the following general formulae:

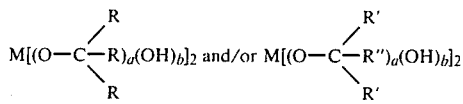

where the mol ratio of a to b is from about 100:0 to 80:20, preferably from about 100:0 to 88:12, and where R, R' and R" are the same as defined above and where M is barium, calcium and/or strontium, preferably barium, or mixture of said metal salts or alcoholates.

The organoaluminum compounds used in the practice of the present invention are alkyl and cycloalkylaluminum compounds. These compounds can be prepared by reacting aluminum metal with an olefin in the presence of hydrogen. Another method, for example, comprises the reaction:

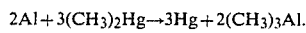

Other methods can be used. See "Aluminum Alkyls," Texas Alkyls, Copyright 1976 by Stauffer Chemical Company, Westport, Conn., 71 pages including the bibliography shown therein and "Encyclopedia of Polymer Science and Technology," Vol. 1, 1964, Interscience Publishers a division of John Wiley & Sons, Inc., New York, Pages 807 to 822. These organoaluminum compounds have the general formula $R_3^{III}Al$ where $R^{III}$ is an alkyl radical or cycloalkyl radical, which may be the same or different, of from 1 to 20, preferably of from 1 to 10, carbon atoms. Mixtures of these organoaluminum compounds can be used. Examples of such compounds are trimethyl aluminum, triethyl aluminum, tri-n-propyl aluminum, triisopropyl aluminum, pentyl diethyl aluminum, 2-methylpentyl-diethyl aluminum, tri-n-butyl aluminum, triisobutyl aluminum, dicyclohexylethyl aluminum, tri-n-pentyl aluminum, tri-n-hexyl aluminum, tri-n-octyl aluminum, tri(2-ethylhexyl)aluminum, tricyclopentyl aluminum, tricyclohexyl aluminum, tri(2,2,4-trimethylpentyl)aluminum, tri-n-dodecyl aluminum, and tri(2-methylpentyl)aluminum and the like.

The organomagnesium compounds used in the practice of the present invention are alkyl and cycloalkyl magnesium compounds. These compounds can be prepared by the action of $R_2Hg$ on magnesium, the reaction being facilitated by the presence of ether. They, also, may be prepared by allowing olefins to react under pressure at about 100° C. with magnesium metal in the presence of hydrogen. Please see "Organometallic Compounds," Coates et al, Vol. 1, 1967, 3rd Ed., Methuen & Co. Ltd., London. These organomagnesium compounds have the general formula $R_2^{IV}Mg$ where $R^{IV}$ is an alkyl radical or cycloalkyl radical, which may be the same or different, of from 1 to 20, preferably of from 1 to 10, carbon atoms. Mixtures of these organomagnesium compounds can be used. Examples of such compounds are dimethyl magnesium, diethyl magnesium, dipropyl magnesium, di-n-butyl magnesium, di-sec-butyl magnesium, di-n-amyl magnesium, methyl-ethyl magnesium, n-butyl ethyl magnesium (BEM), n-propylethyl magnesium, di-n-hexyl magnesium, dicyclohexyl magnesium, cyclohexylethyl magnesium, didecyl magnesium, di-ter-butyl magnesium and didodecyl magnesium and the like.

Organo Mg-Al complexes can be used instead of mixtures of Mg and Al compounds. One method of preparation is to add the organoaluminum compound to a reactor containing the reaction products of organic halides with magnesium in hydrocarbon solvent. After filtration of the reaction mixture, there is obtained a solution of the complex containing little soluble halides. Please see Malpass et al, "Journal of Organometallic Chemistry," 93 (1975), Pages 1 to 8. These complexes will have the general formula $R_m^{III}Al_n \cdot R_p^{IV}Mg_q$ where the mol ratio of Al to Mg is as set forth herein, where m, n, p and q are numbers sufficient to satisfy the required valences of the radicals and atoms and where $R^{III}$ and $R^{IV}$ are alkyl or cycloalkyl radicals, which may be same or different, as described above.

In the catalyst composition the mol ratio computed as metal of magnesium to aluminum is from about 105:1 to 1.5:1, and the mol ratio computed as metal of barium, calcium and/or strontium to magnesium is from about 1:10 to 1:2.

Just prior to polymerization, the barium salt, the organoaluminum compound and the organomagnesium compound (or the organoaluminum.magnesium complex) each in hydrocarbon solution are mixed together. The time required to form a catalyst complex or composition ranges from a few minutes to an hour or longer depending on the reaction temperature. This should be accomplished under an inert atmosphere, and the ingredients may be heated to speed reaction at temperatures of from about 25° to 100° C., preferably from about 40° to 60° C. After the catalyst composition has formed, the polymerization solvent and monomer(s) may be charged to the catalyst, or the preformed catalyst dissolved in its solvent may be injected into a reactor containing the monomers dissolved in the hydrocarbon polymerization solvent.

The monomers to be polymerized can be ethylenically unsaturated monomers or heterocyclic monomers. The ethylenically unsaturated polymerizable monomers to be polymerized with the catalysts of the present invention are those having an activated unsaturated double bond, for example, those monomers where adjacent to the double bond there is a group more electrophilic than hydrogen and which is not easily removed by a strong base. Examples of such monomers are nitriles like acrylonitrile and methacrylonitrile; acrylates and alkacrylates like methyl acrylate, ethyl acrylate, butyl acrylate, ethyl hexyl acrylate, octyl acrylate, methyl methacrylate, ethyl methacrylate, butyl methacrylate, methyl ethacrylate, ethyl ethacrylate, butyl ethacrylate and octyl ethacrylate; the dienes such as butadiene-1,3 and isoprene; and the vinyl benzenes like styrene, alpha methyl styrene, p-tertiary butyl styrene, divinyl benzene, methyl vinyl toluene and para vinyl toluene and the like and mixtures of the same. Examples of polymerizable heterocyclic monomers are oxiranes like ethylene oxide, propylene oxide, 1,2-butylene oxide, styrene oxide, isobutylene oxide, allyl glycidyl ether, phenyl glycidyl ether, crotyl glycidyl ether, isoprene monoxide, butadiene monoxide, vinyl cyclohexane monoxide and the like and mixtures thereof. Other heterocyclic monomers which may be polymerized are siloxanes such as octamethyl tetrasiloxane, thiiranes like propylene sulfide, thiatanes like thiacyclobutane and lactams like epsilon-caprolactam. Depending on the monomer employed, the resulting polymers can be rubbery, resinous, or thermoplastic. For example, a homopolybutadiene prepared according to the present invention having 90% trans content is thermoplastic or resinous, while a copolymer of butadiene and styrene containing about 15–20% styrene and 90% trans is still rubbery.

Preferred monomers for use in the practice of the present invention are mixtures of butadiene-1,3 and up to about 30% by weight total of the mixtures of styrene to make rubbery copolymers exhibiting a high trans-1,4 content and a low vinyl content. Moreover, by altering the butadiene-styrene copolymer composition or microstructure a rubber can be prepared which has behavior closely simulating that of natural rubber in building tack and green strength. Thus, it is within the scope of this invention to prepare polymers which can serve as replacements in those applications where natural rubber is employed such as in tires.

The obtained number-average molecular weight in the absence of chain transfer is controlled by the molecular weight calculated from the ratio of grams of monomer polymerized to moles of catalyst charged. Conversions of monomer to polymer up to about 100% may be obtained.

Temperatures during solution polymerization can vary from about 0° to 150° C. Preferably, polymerization temperatures are from about 30° to 100° C. Time for polymerization will be dependent on the temperature, amount of catalyst, type of polymers desired and so forth. Only minor amounts of the catalyst composition are necessary to effect polymerization. However, the amount of catalyst employed may vary with the type of polymer desired. For example, in general, when making polymers having a high average molecular weight using a given amount of monomer, only a small amount of the catalyst complex is necessary whereas when making a low average molecular weight polymer, larger amounts of the catalyst complex are employed. Moreover, since the polymer is a living polymer, it will continue to grow as long as monomer is fed to the polymerization system. Thus, the molecular weight can be as high as a million or even more. On the other hand, very high molecular weight polymers require lengthy polymerization times for a given amount of the catalyst complex, and at lower catalyst complex concentrations the polymerization rate will drop. A useful range of catalyst complex to obtain readily processable polymers in practicable times is from about 0.00001 to 0.10, preferably from about 0.00033 to 0.005, mol of the catalyst complex or composition computed as magnesium per 100 grams total of monomer(s).

Since the polymer in solution in the polymerization media is a living polymer or since the polymerization is a non-terminating polymerization (unless positively terminated by failure to add monomer or by adding a terminating agent such as methanol), block polymers can be prepared by sequential addition of monomers or functional groups can be added. Also, since the living polymer contains a terminal metal ion, it as shown above can be treated with an epoxide like ethylene oxide and then with water to provide a polymer with a terminal hydroxyl group for reaction with a polyisocyanate to jump the polymer through formation of polyurethane linkages.

The polymerization is conducted in a liquid hydrocarbon solvent. While bulk polymerization may be used, such presents heat transfer problems which should be avoided. In solvent polymerizations it is preferred to operate on a basis of not over about 15 to 20% polymer solids concentration in the solvent to enable ready heat transfer and processing. Solvents for the monomers and polymers should not have a very labile carbon-hydrogen bond and should not act at least substantially as chain terminating agents. They preferably should be liquid at room temperature (about 25° C.). Examples of such solvents are benzene (less desirable), toluene, the xylenes, the trimethyl benzenes, hemimellitene, pseudocumene, mesitylene, prehnitene, isodurene, o, m, and p cymenes, ethylbenzene, n-propylbenzene, cumene, 1,2,4- or 1,3,5-triethylbenzene, n-butyl benzene and other lower alkyl substituted benzenes, hexane, heptane, octane, nonane, cyclohexane, cycloheptane, cyclooctane and the like and mixtures of the same. The saturated aliphatic and cycloaliphatic solvents and mixtures thereof are preferred. Some solvents may give lower trans contents but on the other hand may give higher molecular weights.

Polymerization, of course, should be conducted in a closed reactor, preferably a pressure reactor, fitted with a stirrer, heating and cooling means, with means to flush with or pump in an inert gas such as nitrogen, neon, argon and so forth in order to polymerize under inert or non-reactive conditions, with means to charge monomer, solvent and catalyst, venting means and with means to recover the resulting polymer and so forth.

The rate of polymerization can be increased by the addition of small (catalytic) amounts of ethers, amines or water. For example, the addition of anisole to the Mg-Al-Ba catalyst system increased the rate of copolymerization of butadiene with styrene in cyclohexane at 50° C. without affecting the percent trans-1,4 content and the rate of incorporation of styrene. Anisole appears to be more effective for increasing the rate of polymerization than triethylamine but less effective than tetrahydrofuran (THF). However, a polybutadiene prepared in the presence of THF had a microstructure of 75% trans and 6% vinyl.

A small amount (catalytic) of free water, oxygen or ammonia, also, seems to be beneficial in the preparation of polymers with the Ba-Al-Mg initiator system. The addition of a small amount of either of these materials increases the polymerization rate and the molecular weight of polymers prepared with this novel initiator system. When the free water is added in small amounts, the trans-1,4 content of the polybutadiene or butadiene-1,3/styrene copolymer is not affected if the mole ratio of the Ba salt to the organomagnesium compound is kept at Ba/Mg=0.20.

The rate of polymerization can also be increased by increasing the initial molar concentrations of monomers like butadiene and the Mg-Al-Ba catalyst composition.

Since the polymers produced by the method of the present invention contain active sites or are living polymers, they can be chain extended or branched at any practical time prior to termination or short stopping the polymerization reaction. This may be obtained by adding to the polymerization reaction media chain extenders or branching compounds such as dibromomethane, 1,2-dibromoethane, silicon tetrachloride and hexachlorosilane. Other chain extenders that may be used include divinyl and trivinyl aromatic compounds like divinyl benzene (1,2; 1,3 or 1,4), 1,3 divinyl naphthalene, 1,2,4-trivinyl benzene, vinyl silanes (such as di, tri and tetravinyl silanes) and so forth; diisocyanates and polyisocyanates like 1,6-diisocyanate hexane (may be carcinogenic), diphenylmethane diisocyanate and so forth (isocyanates like tolylene diisocyanate and tetramethylene diisocyanate may be unsatisfactory); diepoxides like cyclohexane diepoxide, 1,4-pentane diepoxide and so forth; polyepoxides having more than 2 epoxide groups like a phenolic novolak epoxide or a tetra phenylolethane epoxide; diketones like 2,4-hexane-di-one, 2,5-hexane-di-one and so forth and dialdehydes like 1,4-butanediol, 1,5-pentanedial and so forth (see U.S. Pat. No. 3,985,830). The chain extender should be soluble in the polymerization media such as the solvent. Moreover, the chain extender should not kill the carbanions, or if it does, there should be sufficient carbanions present so that the chain extension proceeds in a satisfactory manner before the chain extension reaction ceases. The chain extender can be used in an amount of from about 0.01 to 10.0 parts by weight per 100 parts by weight total of the monomers initially charged. For example, butadiene or mixtures of at least 50% by weight of butadiene and the balance essentially styrene can be polymerized to about 85% by weight conversion to provide homopolymers or block or random copolymers using the catalyst composition of the present invention and then can be reacted with one of the branching or chain extending compounds such as mentioned above to obtain extended, branched or star polymers. Compounds such as chlorosilanes, esters of poly carboxylic acids such as the triethyl ester of trimellitic acid and the like terminate the polymerization reaction. On the other hand compounds like divinyl benzene (preferred), trivinyl benzene, divinyl naphthalene, divinyl silane, trivinyl silane, tetravinyl silane, the organic diisocyanates and the epoxides having more than two epoxide groups can provide non-terminating extended, branched or star polymers which still contain anionic sites in the center of the molecule which are capable of reacting and/or initiating polymerization of polar cyclic or vinyl monomers. Thus, these non-terminating polymers, such as star polymers, then can be reacted or polymerized further with copolymerizable polar materials like the acrylates (ethyl acrylate, butyl acrylate and the like), the alkacrylates (methyl methacrylate (preferred), ethylmethacrylate and so forth), the nitriles (like acrylonitrile, methacrylonitrile and so forth), the epoxides (like ethyleneoxide, propyleneoxide and so forth), the siloxanes (like octomethyl tetrasiloxane and the like), and the lactones (like epsilon-caprolactone) to provide star based butadiene or butadiene-styrene copolymers having different characteristics due to the added polar material such that they may become more compatible with resins like polystyrene, polymethylmethacrylate, FRPs (thermosetting polyester-styrene-glass fiber compositions) and so forth as impact modifiers and low profile or low shrink additives. The polar material may be polymerized onto the star polymer in an amount of up to about 30 parts by weight of the polar material per 100 parts by weight of the star polymer. Further addition of catalyst during the branching and addition reactions or polymerizations is generally not required since the original polymer and star polymer (if not terminated) contain active sites for further addition or polymerization. A feature of this aspect of the present invention is that one can obtain star polymers with a high trans content and the ability to crystallize and further, if desired, with compatibilizing groups like acrylate groups, nitrile groups and so forth.

After polymerization the catalyst may be terminated by adding water, alcohol or other agent to the polymeric solution. After the polymer has been recovered and dried, a suitable antioxidant such as 2,6-di-tert-butyl-p-cresol or other antioxidant may be added to the same. However, the antioxidant may be added to the polymeric solution before it is stripped of solvent.

The polymers produced by the method of the present invention can be compounded and cured in the same manner as other plastic and rubbery polymers. For example, they can be mixed with sulfur or sulfur furnishing materials, peroxides, carbon black, $SiO_2$, $TiO_2$, $Sb_2O_3$, red iron oxide, other rubber fillers and pigments, tetramethyl or ethyl thiuram disulfide, benzothiazyl disulfide and rubber extending or processing mineral or petroleum oils and the like. Stabilizers, antioxidants, UV light absorbers and other antidegradants can be added to these polymers. They can also be blended with other polymers like natural rubber, butyl rubber, butadiene-styrene-acrylonitrile terpolymers, polychloroprene, SBR, polyurethane elastomers and so forth.

The polymers produced by the method of the present invention can be used in making protective coatings for fabrics; body and engine mounts for automobiles; gaskets; sidewalls, treads and carcasses for tires; belts; hose; shoe soles; and electric wire and cable insulation; and as plasticizers and polymeric fillers for other plastics and rubbers. With large amounts of sulfur hard rubber products can be made.

The following examples will serve to illustrate the present invention with more particularity to those skilled in the art. Parts are parts by weight unless otherwise stated.

The polymerizations described in the examples were carried out in an argon atmosphere in capped glass bottles fitted with neoprene rubber gasket inner liners. Solvents were purified by passing the liquid through columns of 5 Å molecular sieves. Butadiene (99 mol %) was purchased from Phillips Petroleum Company. Purification was accomplished by passing the BD through columns of 13X molecular sieves. Isoprene was purchased from Phillips Petroleum (99.5 mol % pure) and was further purified by distillation from sodium ribbon. Styrene was purchased from Gulf Oil Chemical and El Paso Products, Texas, and vacuum distilled from a small quantity of (n-butyl) (sec-butyl) magnesium. Propylene oxide was used as received from Oxirane Corporation (contained 75 parts of water per million).

In charging the polymerizations, the order of addition of materials was solvent first, then Mg-Al alkyls, next the barium salt, and finally the monomer(s). The copolymer composition and percent polybutadiene microstructure were obtained from infrared analysis, unless otherwise noted, and from $^{13}C$ NMR (Nuclear Magnetic Resonance) for certain polymers. The microstructure values determined from IR and $^{13}C$ NMR were essentially identical. The trans-1,4 and vinyl content were determined using the 967 $cm^{-1}$ and 905 $cm^{-1}$ infrared absorption bands, respectively. Intrinsic viscosities were determined in toluene at 25° C. Gel permeation chromatograms (GPC) were obtained using a Waters Gel Permeation Chromatograph. Solutions at 1 wt.% were injected onto columns at a flow rate of 1 ml/minute. The instrument oven and the differential refractometer were at 50° C. The column set configuration used, as designated by Waters Associates, was $1\times10^6$ Å + $1\times10^5$ Å + $1\times10^4$ Å + $1\times10^3$ Å.

All thermal transitions were obtained by Differential Thermal Analysis (DTA) using a heating rate of 20° C./minute. Crystalline melting temperatures were determined from the position of the endothermic peak(s)

present in the curve, obtained after cooling the sample from 125° C. to −150° C. at approximately 20° C./minute.

X-ray diffraction patterns were obtained from films cured with 1% dicumyl peroxide in the absence of fillers. All the experiments were carried out at room temperature using CuKα radiation and a nickel filter.

EXAMPLE 1

(a) Barium Salt

To 82.2 milliequivalents (meq) of barium metal (5.65 g) was added 325 ml of monomethylamine which had been flash distilled from Na-dispersion. The reactor was cooled to −78° C. with rapid stirring and a deep blue colored solution, characteristic of the amine solution of the metal, was obtained. To this solution a mixture of t-decanol (21 milliequivalents), t-butanol (40 milliequivalents) and water (7.3 milliequivalents) in benzene (3.75 mols total t-alcohols in benzene) was slowly added and the reaction mixture was stirred for 3 hours and then allowed to stand for 2 days at −15° C., which resulted in the quantitative conversion of the alcohols and water to barium salts. After flash distillation of the amine, the resulting white solid (11.28 g) was dried at 100° C. under vacuum. Toluene (475 g) was added to the salts and the reactor was heated to 70° C. for 2 hours. The total alkalinity of a hydrolyzed aliquot of the clear colorless solution, removed from the excess barium metal, measured 0.148 meq of hydroxide per gram or 2.4 wt.% barium salts, demonstrating total dissolution of the salt. The empirical composition of this product can be represented as:

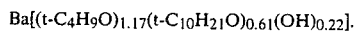

Ba[(t-C$_4$H$_9$O)$_{1.17}$(t-C$_{10}$H$_{21}$O)$_{0.61}$(OH)$_{0.22}$].

(b) Barium-Mg-Al Catalyst Complex Composition

Solutions of (1) [5.4 (n-C$_4$H$_9$)$_2$Mg·(C$_2$H$_5$)$_3$Al] complex (MAGALA-6E) and (2) barium salts, prepared according to Example 1 (a) above, were charged to the polymerization solvent under an inert atmosphere. Prior to addition of monomer(s), the catalyst mixture was permitted to react initially at 60° C. for 15 minutes. The mole ratio of barium to magnesium was based on the moles of total alkalinity of the soluble barium salts (one-half the milliequivalents of titratable base) to the moles of magnesium is MAGALA-6E. MAGALA-6E was obtained from Texas Alkyls (25 wt.% in heptane) and diluted with cyclohexane to a concentration of 0.28 meq of magnesium (0.075 meq aluminum) per gram of solution. The magnesium and aluminum contents were determined by atomic absorption spectroscopy, and the molar ratio of Mg/Al was found to be 5.4/1 for a complex designated by Texas Alkyls, Inc., as MAGALA-6E

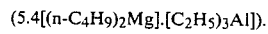

(5.4[(n-C$_4$H$_9$)$_2$Mg]·[C$_2$H$_5$)$_3$Al]).

EXAMPLE 2

This example demonstrates the usefulness of the catalyst, described in Example 1, for the preparation of crystalline butadiene based polymers. Table I, below, shows that polybutadienes of this invention have a high degree of stereoregularity with crystalline melting temperatures of 43° C. and 70° C. The high trans-1,4 configuration (89%) results in a thermoplastic polymer which is hard and highly crystalline at room temperature.

Isoprene can be polymerized with a Mg-Al-Ba catalyst composition, as described in Table I. A polyisoprene was obtained with an isomer content of 49% trans, 39% cis and 12% 3,4.

TABLE I

Molecular Structure of Polydiene and Styrene-Butadiene Copolymer Prepared in Cyclohexane at 50° C. with Mg—Al—Ba Catalyst Composition (Mg/Al = 5.4/1, Ba/Mg = 1/5, mol ratios of metal)

| Run No. | Monomer(s) (grams) | g. Total Monomers per mM (Bu)$_2$Mg | % Conversion (hours) | Wt. % Styrene Charged | Wt. % Styrene Found |
|---|---|---|---|---|---|
| 1 | Butadiene (27.1) | 38.7 | 100 (91) | — | — |
| 2 | Butadiene/Styrene (24.4/7.0) | 45.5 | 86 (118) | 22 | 17 |
| 3 | Isoprene (23.9) | 34.1 | 98 (77) | — | — |

| Run No. | % Diene Structure Trans-1,4 | % Diene Structure Vinyl | tol [η]25 dl/g | Peak Crystalline Melting Temp. (°C.) |
|---|---|---|---|---|
| 1 | 89 | 2 | 2.11 | 43, 70 |
| 2 | 88[a] | 2[a] | 1.60 | 19 |
| 3 | 49[a] | (12)[a,b] | 0.92 | None observed. |

[a] percent microstructure determined by $^{13}$C NMR
[b] value in parenthesis represents 3,4 content The rate of polymerization is faster for butadiene polymers than for butadiene-styrene copolymers. For example, complete conversion of butadiene to polymer is readily obtained in 24 hours at 65° C. With butadiene-styrene copolymers, it is difficult to obtain a conversion in excess of 90% in 24 hours at 65° C. Further, the remaining 10% monomer in the SBR system is primarily styrene, and it requires in excess of 72 hours at 65° C. to obtain complete conversion. Viscosities (η) are intrinsic viscosities in deciliters per gram in toluene at 25° C.

EXAMPLE 3

A polystyrene-polybutadiene diblock copolymer (41% styrene) was prepared with the Mg-Al-Ba catalyst composition (described in Example 1) by the addition of butadiene to a non-terminated solution of polystyryl carbanions. Styrene was polymerized to 96% conversion, see Table II, below, and the resulting polystyryl carbanion was used in Run 5. All polymerizations were conducted in cyclohexane at 50° C.

TABLE II

Preparation of Polystyrene-Polybutadiene Diblock Copolyer and Hydroxyl Terminated Polybutadiene with Mg—Al—Ba Catalyst

| Run No. | Monomers(s) (grams) | g. Total Monomers per mM (Bu)$_2$Mg | % Conversion (hours) | Wt. % Composition | $\overline{M}_n$ × 10$^{-3d}$ | tol [η]25 dl/g[d] |
|---|---|---|---|---|---|---|
| 4 | Styrene[a] | 15.9 | 96[a] (48) | % styrene | 20[c] | 0.20 |

TABLE II-continued

Preparation of Polystyrene-Polybutadiene Diblock Copolyer and Hydroxyl Terminated Polybutadiene with Mg—Al—Ba Catalyst

| Run No. | Monomers(s) (grams) | g. Total Monomers per mM (Bu)$_2$Mg | % Conversion (hours) | Wt. % Composition | $\overline{M}_n$ × $10^{-3 d}$ | tol $[\eta]25$ dl/g$^d$ |
|---|---|---|---|---|---|---|
|   | (10.5) |   |   | = 100 |   |   |
| 5 | Polystyryl (10.5) |   | 1. 96 (48) |   |   |   |
|   | Butadiene (14.8) | 39.1 | 2. 98 (119) | % styrene = 41 | 114$^c$ | 0.93 |
| 6 | Butadiene (24.2) | 23.5 | 88 (115) |   |   |   |
|   | Ethylene Oxide (0.09) |   |   | % hydroxyl = 0.031 | 51$^b$ | 1.31 |

$^a$polystyrene precursor used in the preparation of polystyrene-polybutadiene diblock copolymer (Run 5).
$^b\overline{M}_n$ measured by membrane osmometry.
$^c\overline{M}_n$ estimated by GPC.
$^d$final polymer.

Figure 3:
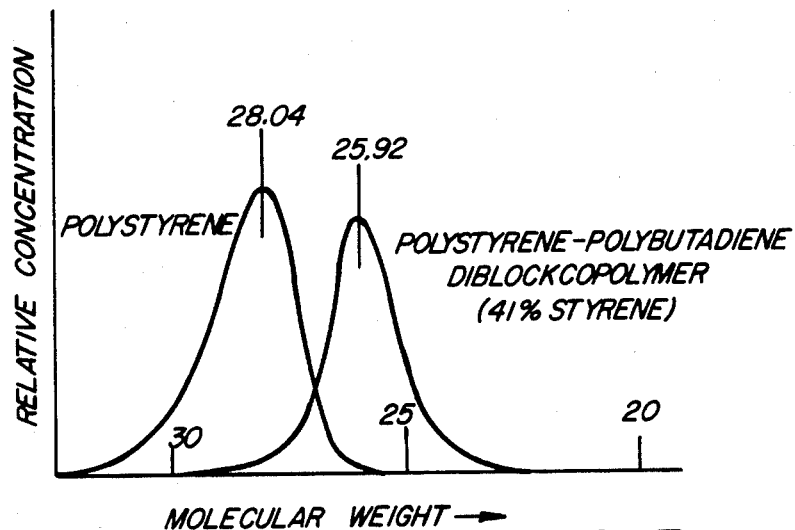
FIG. 3 is a graph showing the gel permeation chromatograms of polystyrene and polystyrene-polybutadiene diblock copolymer prepared with the Mg-Al-Ba composition catalyst.

FIG. 3 shows two MWD (Molecular Weight Distribution) curves of this diblock copolymer (Run 5) and its polystyrene precursor (Run 4). A comparison of the peak positions in the MWD curves and the shapes of the curves demonstrates the successful preparation of a diblock copolymer. Homopolymers of styrene or butadiene could not be extracted from the reaction products using acetone/cyclohexane (75/25) and n-pentane as solvents for polystyrene and polybutadiene, respectively, and as nonsolvents for the diblock copolymer.

A hydroxyl terminated polybutadiene (Run 6) was prepared by the addition of ethylene oxide at the end of a butadiene polymerization initiated with Mg-Al-Ba catalyst (see Table II). The terminal alkoxide units were then hydrolyzed to form the carbinol. The hydroxyl functionality of this polymer was 0.91 based on hydroxyl equivalent molecular weight and number-average molecular weight.

These results demonstrate that polybutadiene or polystyrene chain ends retain their capacity to add monomer and can be derivatized to result in useful materials. Thus, block copolymers, functionally terminated polymers and polymers with different molecular architecture and molecular weight distribution can be prepared.

EXAMPLE 4

Polymerizations of butadiene were carried out according to Run 1, Example 2 using various Ba and Ca compounds substituted for barium(t-decoxide-t-butoxide-hydroxide), designated as the control. The results are given in Table III, below. Ba salts of t-butanol and mixtures of t-butanol and water, both prepared according to Example 1, were equally effective as the control for the preparation of about 90% trans-1,4 polybutadiene. Barium ethoxide complexed with Mg-Al alkyls polymerized butadiene to a high molecular weight polymer having a diene structure of 76% trans-1,4 and 7% vinyl. Complexes of Mg-Al alkyls with Ca[(t-C$_4$H$_9$O)$_{1.8}$(OH)$_{0.2}$] are catalysts for the quantitative polymerization of butadiene (see Runs 10–13, Table III). However, the maximum in trans-1,4 content of 77% occurred for a Ca$^{2+}$/Mg$^{2+}$ ratio of 0.51 in comparison to a trans-1,4 of up to 90% for a Ba$^{2+}$/Mg$^{2+}$ ratio of 0.20. This example demonstrates the usefulness of certain Ba and Ca alkoxide salts in preparing high trans-1,4 crystallizing polybutadiene.

TABLE III

Effect of Composition of Various Ba and Ca Compounds on the Molecular Structure of Polybutadiene$^a$

| Run No. | Composition of Group IIA Salt | Mole Ratio Me$^{2+}$/Mg$^{2+}$ | % Conversion (hours) |
|---|---|---|---|
| 1 | Ba[(t-C$_{10}$H$_{21}$O)$_{0.61}$ (t-C$_4$H$_9$O)$_{1.17}$(OH)$_{0.22}$] (CONTROL) | 0.20 | 100 (91) |
| 7 | Ba[(t-C$_4$H$_9$O)$_{1.8}$(OH)$_{0.2}$] | 0.20 | 90 (43) |
| 8 | Ba (t-C$_4$H$_9$O)$_2$ | 0.20 | 96 (71) |
| 9 | Ba (C$_2$H$_5$O)$_2$ | 0.18 | 82 (168) |
| 10 | Ca[(t-C$_4$H$_9$O)$_{1.8}$(OH)$_{0.2}$] | 0.11 | 99 (47) |
| 11 | Ca[(t-C$_4$H$_9$O)$_{1.8}$(OH)$_{0.2}$] | 0.25 | 98 (71) |
| 12 | Ca[(t-C$_4$H$_9$O)$_{1.8}$(OH)$_{0.2}$] | 0.51 | 97 (24) |
| 13 | Ca[(t-C$_4$H$_9$O)$_{1.8}$(OH)$_{0.2}$] | 0.90 | 100 (72) |
| 13-1 | Ba[t-C$_{10}$H$_{21}$O)$_{1.8}$(OH)$_{0.2}$] | 0.20 | 100 (70) |

| Run No. | % Diene Structure | | Crystalline Melting Temp., °C. | tol $[\eta]25$ dl/g |
|---|---|---|---|---|
|  | Trans | Vinyl | | |
| 1 | 89 | 2 | 43, 70 | 2.11 |
| 7 | 90 | 3 | 29, 59 | 1.38 |
| 8 | 88 | 2 | 41, 68 | 2.92 |
| 9 | 76 | 7 | 9 | 1.68 |
| 10 | 64 | 8 | −30 | Soft Polymer |
| 11 | 70 | 7 | −11 | Soft Polymer |
| 12 | 77 | 6 | 11, 27 | 0.90 |
| 13 | 72 | 6 | −2 | 1.36 |
| 13-1 | 86 | 3 | 38, 58 | Rubber |

$^a$polymerization solvent: cyclohexane - polymerization temperature: 50° C. Me$^{2+}$: Ba$^{2+}$ or Ca$^{2+}$

EXAMPLE 5

The effect of the mole ratio of Mg/Al in organometallic complexes of magnesium and aluminum on percent polybutadiene microstructure is shown in Table IV, below. The Mg-Al-Ba catalysts were prepared according to Example 1 at constant Ba/Mg mole ratio of about 1/5. A control polymerization of butadiene with (sec-C$_4$H$_9$)Mg(n-C$_4$H$_9$) in combination with a barium salt prepared according to Example 1 resulted in a trans-1,4 content of 67%, in the absence of Et$_3$Al. A trans-1,4 content of only 81% was obtained in polymers made with a Ba-MgAl complex at Mg/Al=105/1 (MAGALA-DNHM, Texas Alkyls, Inc.) catalyst (Run 20). No polymerization of butadiene occurred with a barium salt in combination with MAGALA-0.5E (Mg/Al=1/2) (Runs 14, 15 and 16 below). The highest degree of stereoregularity was obtained with complexes of barium salts with MAGALA-6E or MAGALA-7.5E (Runs 17 and 18). The trans-1,4 contents in these polybutadienes were 89% with 2% or 3% vinyl unsaturation.

contents of about 90%, crystalline melt temperatures of 43° C. and 70° C., intrinsic viscosities of about 2.0 in toluene at 25° C., and absence of gel.

TABLE V

Effect of Mole Ratio of Barium Salts to $(Bu)_2Mg$ in Mg—Al—Ba Catalyst on Molecular Structure of Polybutadiene

| Run No. | Mole Ratios | | % Conversion (hours) | % Diene Structure | | Crystalline Melting Temp., °C. | tol [η]25 dl/g |
|---|---|---|---|---|---|---|---|
| | $Ba^{2+}/Mg^{2+}$ | $Al^{3+}/Ba^{2+}$ | | Trans | Vinyl | | |
| 22 | 0 | 0 | No apparent pzn. of butadiene with MAGALA-6E, alone | — | — | — | — |
| 23 | 0.05 | 3.91 | No apparent pzn. (72 hours) | — | — | — | — |
| 24 | 0.11 | 1.67 | 63 (72) | 87 | 2 | 36, 60 | 2.35 |
| 1 | 0.20 | 0.85 | 100 (91) | 89 | 2 | 43, 70 | 2.11 |
| 25 | 0.30 | 0.62 | 96 (72) | 79 | 3 | −9, 33 | 2.26 |
| 26 | 0.52 | 0.35 | 99 (74) | 73 | 4 | −16, 24 | 1.82 |
| 27 | 1.00 | 0.18 | 94 (44) | 64 | 7 | −15 | 0.82 |

Polymerization Conditions:
1. Polymerizations were carried out in cyclohexane at 50° C.
2. Molar concentrations of butadiene and $(Bu)_2Mg$ were approximately:
   $[Butadiene]_o = 2.4$;
   $[(Bu)_2Mg]_o = 2.8 \times 10^{-3}$ tion.

TABLE IV

Effect of Mg/Al Mole Ratio in Mg—Al Complexes on Microstructure of Polybutadiene

| Run No. | Organometallic Complex of Mg and Al | Mole Ratios | | | % Diene Structure | |
|---|---|---|---|---|---|---|
| | | Mg/Al | Ba/Mg | Al/Ba | Trans | Vinyl |
| 14[a] | 1(n-Bu)$_2$Mg.2(Et)$_3$Al | 0.54 | 0.19 | 9.70 | No Polymerization | |
| 15[a] | 1(n-Bu)$_2$Mg.2(Et)$_3$Al | 0.54 | 0.29 | 6.40 | No Polymerization | |
| 16[a] | 1(n-Bu)$_2$Mg.2(Et)$_3$Al | 0.54 | 0.61 | 3.00 | No Polymerization | |
| 17[b] | 5.4(n-Bu)$_2$Mg.1(Et)$_3$Al* | 5.4* | 0.19 | 0.97 | 89 | 2 |
| 18[b] | 7.6(n-Bu)$_2$Mg.1(Et)$_3$Al# | 7.6# | 0.16 | 0.82 | 89 | 3 |
| 19[b] | 27(n-hexyl)$_2$Mg.1(Et)$_3$Al | 27.0 | 0.22 | 0.17 | 83[c] | 4[c] |
| 20[b] | 105(n-hexyl)$_2$Mg.1(Et)$_3$Al[d] | 105.0 | 0.22 | 0.04 | 81 | 4 |
| 21[b] | (sec-Bu)Mg(n-Bu) | No Al | 0.12 | 0 | 67 | 10 |

[a]polymerizations were carried out in n-hexane at 65° C.
[b]polymerizations were carried out in cyclohexane at 50° C.
[c]estimated values from infrared spectrum of polymer film.
[d]MAGALA DNHM, Texas Alkyls, Inc. - di-n-hexyl magnesium containing 1-2 mole % Et$_3$Al relative to the Mg compound.
*MAGALA-6E; 5.4 ratio as analyzed.
MAGALA-7.5E; 7.6 ratio as analyzed.

EXAMPLE 6

The effect of the mole ratio of barium(t-decoxide-t-butoxide-hydroxide), prepared according to Example 1, to dibutylmagnesium in MAGALA-6E on polybutadiene microstructure and molecular weight is summarized in Table V, below. The polymerization charge was the same as given in Run 1 of Example 2. FIG. 2 shows that the amount of trans-1,4 structure is increased to a maximum of about 90% as the mole ratio of $Ba^{2+}/Mg^{2+}$ is decreased from 1.0 to about 0.2. Concurrently, the vinyl content decreased from 7% to 2%. No polymerization of butadiene was observed in cyclohexane at 50° C. after 3 days with MAGALA-6E alone or with a mole ratio of $Ba^{2+}/Mg^{2+} = 0.05$.

Polybutadienes prepared with mole ratios of $Ba^{2+}/Mg^{2+}$ equal to 0.2 are characterized by trans-1,4

EXAMPLE 7

The catalyst complex of MAGALA-6E and barium(t-decoxide-t-butoxide-hydroxide), Example 1, was used to prepare polybutadienes according to Example 2, in n-hexane and toluene, as well as cyclohexane. The structural analysis, as shown in Table VI, below, shows that a high trans-1,4 polybutadiene was formed in these solvents. A slightly lower trans-1,4 content and intrinsic viscosity were obtained for the polymer prepared in toluene.

TABLE VI

Effect of Solvent on the Molecular Structure of
Butadiene Based Polymers Prepared with $Ba[(t-RO)_{2-x}(OH)_x]$
5.4 (n-Bu)$_2$Mg.1(Et)$_3$Al (MAGALA-6E)
Catalyst Composition of Example 1.
Polymerization Temp. = 50° C.

| Run No. | Polymerization Solvent | % Styrene | % Diene Structure Trans | % Diene Structure Vinyl | tol [η]25 dl/g | Crystalline Melting Temp., °C. |
|---|---|---|---|---|---|---|
| 28 | n-hexane | 8 | 88 | 2 | 2.02 | 23, 34 |
| 1 | Cyclohexane | 0 | 89 | 2 | 2.11 | 43, 70 |
| 29 | Toluene | 0 | 85 | 3 | 1.84 | 24, 36 |

It, also, is possible to prepare polybutadienes in cyclohexane at 50° C. with trans-1,4 contents of 88% (3% vinyl) with Mg-Al-Ba catalysts obtained by combining barium (t-alkoxide-hydroxide) with (sec-C$_4$H$_9$)Mg-(n-C$_4$H$_9$) and C$_2$H$_5$)$_3$Al, instead of the commercial MAGALA, in mole ratios of Mg/Al of 2 to 3 and Ba/Mg of 0.20. An increase in Mg/Al mole ratio (at constant Ba/Mg) from 3 to 6 to 15 to 25 results in a decrease in trans-1,4 content from 88% to 86% to 83% to 80%.

EXAMPLE 8

Table VII, below, compares the temperature dependence for SBR's prepared with the Mg-Al-Ba catalyst composition of Example 1 in cyclohexane. Trans-1,4 content increased from 83% to 90% as polymerization temperature decreased from 75° C. to 30° C. The increase in trans-1,4 content with decreasing polymerization temperature occurred with corresponding decreases in both vinyl and cis-1,4 contents. It is to be noted that high trans-1,4 SBR's can be prepared over a fairly wide range of polymerization temperatures with this catalyst system.

TABLE VII

Effect of Polymerization Temperature on
Molecular Structure of High Trans SBR

| Run No. | Wt. % Styrene | Polymerization Temperature (°C.) | % Conversion (hours) | % Diene Structure Trans | % Diene Structure Vinyl | tol [η]25 dl/g |
|---|---|---|---|---|---|---|
| 30 | 6.5 | 30 | 55 (172) | 90.0 | 1.6 | 0.88 |
| 31 | 17.0 | 50 | 86 (118) | 88.0 | 2.1 | 1.60 |
| 32 | 22.0 | 65 | 95 (119) | 85.6 | 3.1 | 1.54 |
| 33 | 23.2 | 75 | 92 (23) | 82.9 | 3.7 | 1.49 |

Mole Ratio: Ba/Mg = 0.20

EXAMPLE 9

The concentration of the Mg-Al-Ba catalyst composition of Example 1 with constant $Ba^{2+}/Mg^{2+}$ ratio (0.20) has a marked effect on the trans-1,4 content of polybutadiene, as shown in Table VIII, below. The trans-1,4 content approaches a limiting value of about 90% as the molar ratio of butadiene to dibutylmagnesium decreases from 1549 to 795. The intrinsic viscosity increases with an increase in this ratio suggesting that the polymer molecular weight is controlled by the ratio of grams of butadiene polymerized to moles of catalyst charged.

TABLE VIII

Effect of Catalyst Concentration on Molecular Structure
of Polybutadiene Prepared with Mg—Al—Ba Catalyst

| Run No. | Initiator Charged (mM) Ba Salt | Initiator Charged (mM) (Bu)$_2$Mg | Bd Charged (grams) | Initial Molar Ratio [Bd]$_o$/[(Bu)$_2$Mg]$_o$ | % Conv. (hrs.) | % Diene Structure Trans | % Diene Structure Vinyl | tol [η]25 dl/g |
|---|---|---|---|---|---|---|---|---|
| 7 | 0.36 | 1.76 | 28.5 | 299 ($\overline{M}_n$ = 8,100)$^a$ | 90 (43) | 90 | 3 | 1.38 |
| 1 | 0.14 | 0.63 | 27.1 | 795 ($\overline{M}_n$ = 21,500)$^a$ | 100 (91) | 89 | 2 | 2.11 |
| 34 | 0.07 | 0.29 | 24.3 | 1549 ($\overline{M}_n$ = 41,900)$^a$ | 100 (96) | 80 | 3 | 4.29 |

Solvent: cyclohexane. Temperature: 50° C. Mole Ratio: Ba/Mg = 0.20.
$^a$Mn calculated from grams of BD charged to gram-equivalents of Mg charged (carbon-Mg).

EXAMPLE 10

Figure 4:
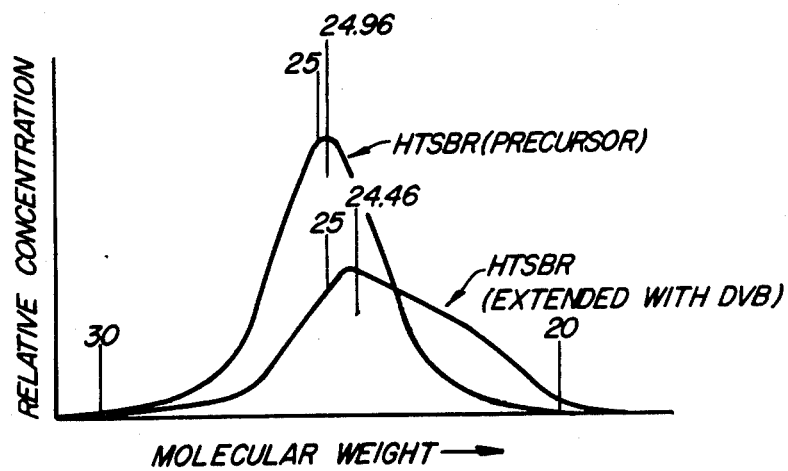
FIG. 4 is a graph showing the effect of chain extension on the molecular weight distribution of high trans styrene-butadiene copolymer rubber (15% styrene)

FIG. 4 shows that the MWD of high trans SBR (15% styrene) can be broadened (changed or controlled) by chain extension with divinylbenzene (DVB). DVB was added at 87% conversion, and the linking reaction of chain ends with DVB (mole ratio of DVB/Mg=1.0) was carried out in cyclohexane at 82° C. for 6 hours.

The shape of the MWD of the linear precursor SBR (Run 35) is fairly narrow with a small fraction of low molecular weight tailing. Heterogeneity indices ($\overline{M}_w/\overline{M}_n$) of 2.0 to 3.0 (estimated by GPC) are representative values of these linear SBR's. A comparison of the shapes of the MWD curves in FIG. 4 shows a buildup in the amount of high molecular weight polymer and an increase in molecular weight as a result of linking of chain ends with DVB.

Figure 5:
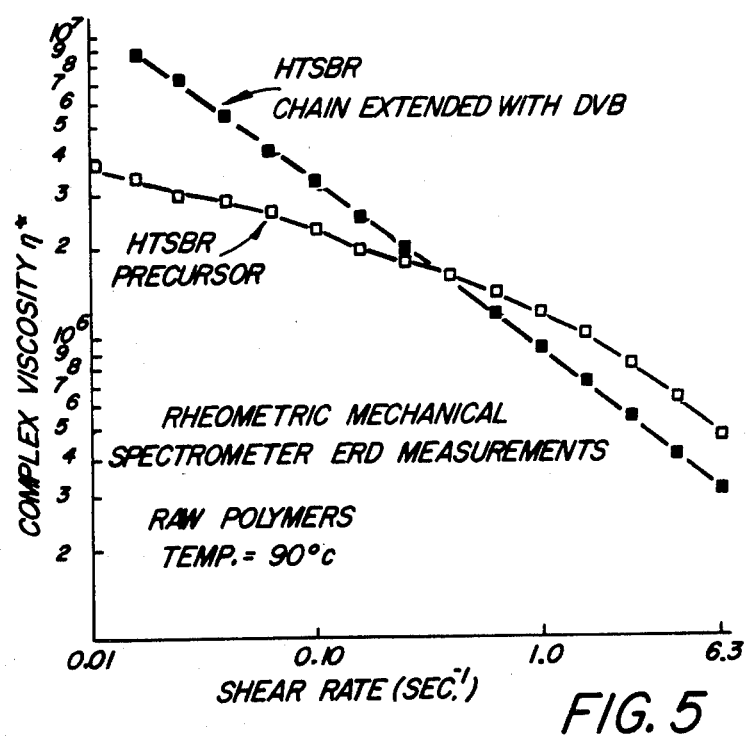
FIG. 5 is a graph showing the effect of chain extension of high trans styrene-butadiene (copolymer) rubber on variation of viscosity with shear-rate.

High trans SBR's chain extended with DVB can be oil extended. They have less cold flow (Table IX below) and improved mill processibility behavior relative to linear high trans SBR's. FIG. 5 compares the rheological behavior of a linear high trans SBR of this invention and a corresponding SBR chain extended with DVB. Measurements of complex viscosity (η*) of these raw polymers at various shear rates were obtained with a Rheometric Mechanical Spectrometer at 90° C. with an eccentric rotating disc (ERD). It can be seen that the chain extended SBR shows higher viscosity at low shear rates and lower viscosity at high shear rates than the linear control polymer. This information correlates well with the lower cold flow of high trans SBR chain extended with DVB.

TABLE IX

Effect of Chain Extension of High Trans SBR on Cold Flow

| Run No. | Wt. % Styrene in Composition | tol [η]25 dl/g | $\overline{M}_w/\overline{M}_n$ (by GPC) | Oil Content (phr) | ML-4 (100° C.) | Cold Flow at 50° C. (mg/min.)[c] |
|---|---|---|---|---|---|---|
| 35[a] | 15 | 1.58 | 3.7 | 0 | 48 | 20.0 |
| 36[a] | 20 | 1.58 | — | 0 | — | 11.9 |
| 37[b] | 15 | 1.95 | 3.2 | 14 | 40 | 3.4 |
| 38[b] | 22 | 2.20 | Bimodal | 0 | — | 0 |
| 39[b] | 21 | 2.20 | Bimodal | 37.5 | 41.5 | 1.0 |

[a] linear SBR, unextended.
[b] SBR's chain extended with divinylbenzene (DVB) after 80–90% conversion.
[c] Phillips Chem. Co. Method WATB 5.01.20 of December 1, 1961.

EXAMPLE 11

An SBR, prepared by the process of the present invention and containing 14.8% styrene with 84.5% trans-1,4 placements in the polybutadiene portion, was cured in the absence of fillers with 1% dicumyl peroxide. The crystalline melt temperature of the peroxide cross-linked SBR was 18° C., obtained on a Perkin-Elmer DSC-II instrument. The cured rubber film was mounted in the unstretched state on an x-ray unit. The sample was subjected to x-ray analysis using CuKα radiation and a nickel filter at room temperature. As shown in FIG. 6, this SBR gum vulcanizate in the unstretched state exhibited a diffuse halo characteristic of a non-crystalline material. At 200% strain, a diffraction pattern of oriented crystalline polymer (equatorial arcs) was observed. Several off-axial reflections appeared in the X-ray scan in addition to the equatorial fiber arc as the sample was elongated to 700%. This result demonstrates the ability of this rubber to undergo strain-induced crystallization. Building tack and green strength are properties often characteristic of a crystallizable elastomer such as natural rubber. It will be demonstrated in the following examples that this set of properties is also characteristic of the SBR's of this invention.

With respect to FIG. 6 the following information is given:

| Photograph | Sample % Elongation | Hours Exposure | Distance of Polymer Sample to X-ray Film, Approx. |
|---|---|---|---|
| A | 0 | 4 | 30 mm. |
| B | 200 | 12 | 30 mm. |
| C | 700 | 6 | 50 mm. |
| D | 700 | 17 | 50 mm. |

EXAMPLE 12

Green strength is a quality that is possessed by natural rubber and is essentially absent in emulsion SBR. In fact, very few synthetic rubbers have green strength comparable to natural rubber. Green strength is a measure of the cohesiveness in stretched, uncured rubber. The presence of green strength in a rubber prevents the occurrence of thinning down and breaking during fabrication of an uncured tire. It is generally accepted that the green strength of natural rubber arises from strain-induced crystallization.

Green strength has been measured for an uncompounded high trans SBR prepared with the Mg-Al-Ba catalyst of this invention. The SBR contained 20% styrene with 88% trans-1,4 polybutadiene placements and exhibited a crystalline melting temperature of 22° C., as measured by DTA. Green strength data was obtained from stress-strain measurements on unvulcanized polymers with an Instron tester at room temperature. The crosshead speed was 50.8 cm/minute. Sample specimens were prepared by press molding tensile sheets at 121° C. for 5 minutes with a ram force of 11360 kg. The data in Table X, below, demonstrate that the green strength (0.95 MPa) of the uncompounded and uncured experimental high trans SBR of this invention was equivalent to natural rubber (MV-5) (peptized No. 3 ribbed smoked sheets; uncured and uncompounded).

Figure 7:
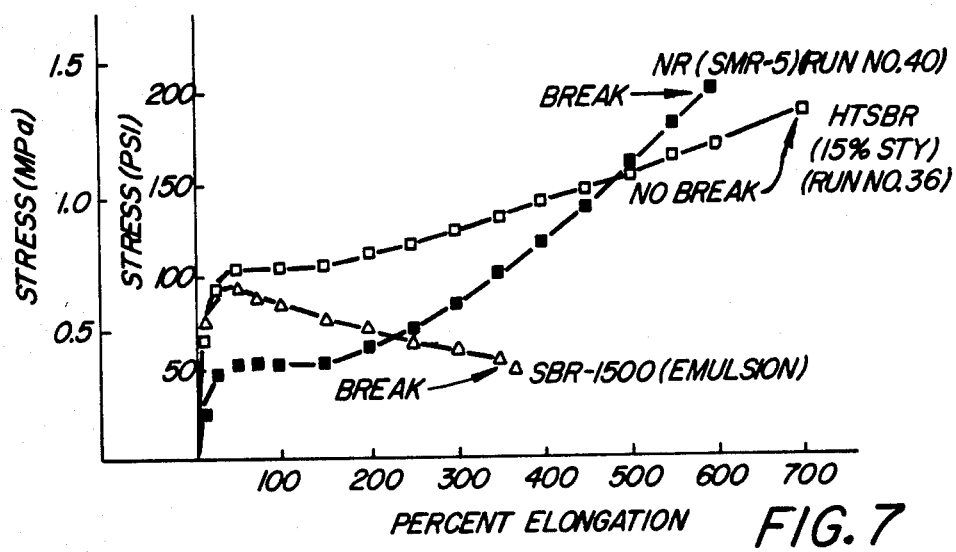
FIG. 7 is a graph showing the "green-strength," stress-strain, of uncured but compounded (45 phr of carbon black) of various rubbers.

The stress-strain curves of uncured, compounded (45 phr HAF carbon black) high trans SBR (15% styrene) with 85% trans content of this invention are compared with natural rubber (SMR-5) and an emulsion SBR in FIG. 7. The green tensile strengths of NR and high trans SBR are nearly equivalent (1.4 MPa). The stress-strain curves of NR and the experimental high trans SBR of this invention have positive slopes above 150% elongation relative to a negative slope in the stress-strain curve of emulsion SBR (SBR-1500). The presence of a positive slope can be taken as evidence for strain-induced crystallization.

TABLE X

Comparison of Green Tensile Strength of Unfilled, Uncured High Trans SBR with Natural Rubber

| | Run No. | |
|---|---|---|
| | 40 Natural Rubber (MV-5) | 36 High Trans SBR (20% Styrene) |
| Mooney Viscosity ML-4 (100° C.) | 72 | 30 |
| Tensile Strength | | |
| PSI | 139 | 138 |
| MPa | 0.96 | 0.95 |
| Elongation at break, % | 633 | 1395 |

EXAMPLE 13

Tack strength is defined as the force required to separate two uncured polymer surfaces after they have been brought into contact. The limiting tack strength of a rubber is necessarily its green strength, or the force required for its cohesive failure. Although high green strength is necessary, it is, by itself, insufficient to insure good tack. High tack strength is an especially desirable property in the fabrication of articles, especially those having a complex geometry, prior to vulcanization.

Tack strength was measured using the Monsanto Tel-Tak machine. The test specimens were raw and compounded polymers pressed between Mylar film at 100° C. Two 0.64 cm×5.08 cm diecut sample strips were placed at right angles to each other and retained in special sample clamps. A fixed load, 0.221 MPa, was then applied for 30 seconds. The samples were pulled apart at a constant separation rate of 2.54 cm/minute. The test was run at room temperature. The true tack values reported in Table XI, below, represent the difference between the apparent tack (rubber versus rubber) and the value obtained for rubber versus stainless steel. The results in Table XI for several uncompounded and uncured rubbers show that the apparent tack strength of high trans SBR (0.28 MPa) of this invention is higher than natural rubber.

The presence of carbon black (45 phr HAF) in formulations of high trans SBR (15% styrene, 85% trans) of this invention and NR (SMR-5) resulted in an increase in tack strength, as shown by comparing data in Tables XI and XII, below. The compounded tack strength of high trans SBR of this invention is equivalent to NR within experimental error. The tack strength of a blend of equal amounts of high trans SBR of this invention and NR was slightly higher than the respective unblended polymers.

Figure 8:
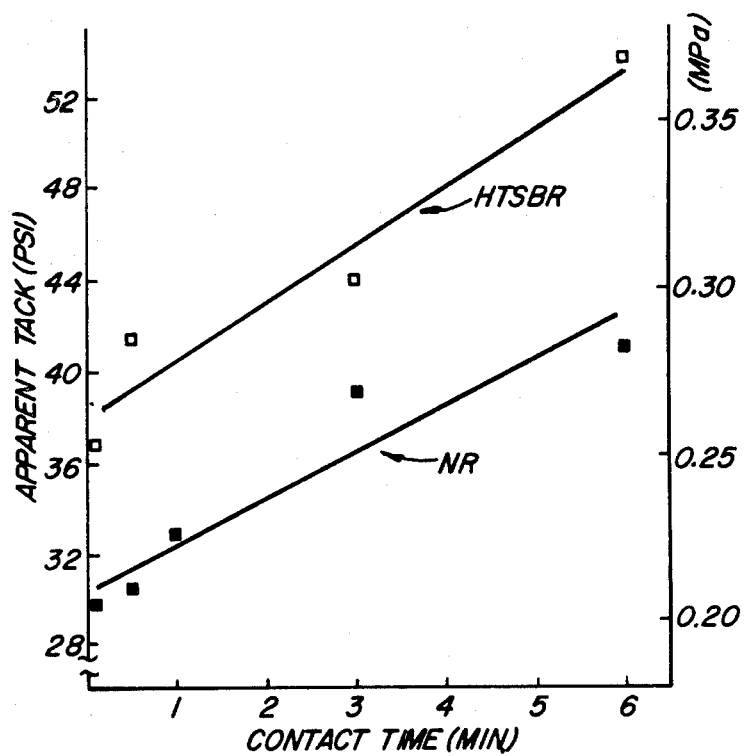
FIG. 8 is a graph showing the effect of contact time on tack strength of high trans styrene-butadiene (copolymer) rubber (15% styrene) of this invention and natural rubber (SMR-5), both uncured but compounded with 45 phr carbon black and 13 phr oil.

It is important in construction of tires that tack strength is developed quickly when two strips of rubber are brought into contact. FIG. 8 shows that high tack strength is obtained for low contact times (6 seconds) for both high trans SBR of this invention and NR. Both rubbers have what is often referred to as "quick-grab".

TABLE XI

Monsanto Tel-Tak of Uncompounded, Uncured Rubbers

| Run No. | Polymer Description | Crystalline Melting Temp., °C. | Tack Strength[a] Apparent PSI | Tack Strength[a] Apparent MPa | Tack Strength[a] True PSI | Tack Strength[a] True MPa |
|---|---|---|---|---|---|---|
| 39[b] | High Trans SBR of this invention (21% styrene, 87% trans) | 24 | 41 | 0.28 | 35 | 0.24 |
| 40 | Natural Rubber (MV-5) | 28 | 34 | 0.23 | 32 | 0.22 |
| 41 | Trans-polypentenamer | 9 | 38 | 0.26 | 35 | 0.24 |
| 42 | High Trans SBR of this invention (23% styrene, 83% trans) | −1 | 34 | 0.23 | 23 | 0.16 |
| 43 | Cis-1,4 Polybutadiene (99% cis) | −6 | 27 | 0.19 | 15 | 0.10 |
| 44 | SBR-1500 (Emulsion)[c] | None Observed | 22 | 0.15 | 4 | 0.03 |

[a]30 seconds contact time, 32 oz. load.
[b]37.5 phr Philrich 5 oil added to polymer.
[c]BD-STY rubber, about 23.5% bound styrene, cold polymerized.

TABLE XII

Monsanto Tel-Tak of Compounded, Uncured Rubbers

| Run No. | Polymer Description | Contact Time (minutes) | Apparent Tack Strength PSI | Apparent Tack Strength MPa |
|---|---|---|---|---|
| 45 | High Trans SBR (15% styrene, 85% trans) | 0.5 | 52 | 0.36 |
| | | 3.0 | 69 | 0.48 |
| | | 6.0 | 69 | 0.48 |
| 46 | Natural Rubber (SMR-5) | 0.5 | 65 | 0.45 |
| | | 3.0 | 64 | 0.44 |
| | | 6.0 | 67 | 0.46 |
| 47 | Blend of 50/50 High Trans SBR/NR (SMR-5) | 0.5 | 71 | 0.49 |
| | | 3.0 | 69 | 0.48 |
| | | 6.0 | 73 | 0.50 |

Formulation for the Above Compounded but Uncured Rubber, Parts by Weight

High Trans

TABLE XII-continued

Monsanto Tel-Tak of Compounded, Uncured Rubbers

| Ingredient | SBR | NR | Blend |
|---|---|---|---|
| Polymer | 100 | 100 | 50/50, NR/High Trans SBR |
| HAF Carbon Black | 45 | 45 | 45 |
| Oil | 5 Naphthenic | 0 | 7 Naphthenic |
| ZnO/Stearic Acid | 5/3 | 5/3 | 5/3 |
| Antioxidant | 2 | 2 | 2 |
| Tackifier 775 | 3 | 3 | 3 |
| Sulfur | 1.0 | 1.0 | 1.0 |
| Total Accelerator | 1.8 | 1.8 | 1.8 |

EXAMPLE 14

A high trans SBR of this invention was prepared according to Run No. 2 in Example 2. The resulting copolymer contained 20% styrene with 86% trans-1,4 content in the polybutadiene portion. The intrinsic viscosity in toluene at 30° C. was 1.82 dl/g. The copolymer showed a crystalline melt temperature of 20° C. in the DTA thermogram.

A description of the compound recipe and cure conditions for the above SBR along with a commercial butadiene-styrene copolymer (SBR-1500) and natural rubber (SMR-5) is given in Table XIII, below. Satisfactory rates of cure in the SBR's were obtained with a sulfur cure accelerated with 2-(morpholino) thiobenzothiazole (NOBS Special) and tetramethylthiuram monosulfide (TMTM). A comparison of the physical properties for these rubbers is given in Table XIV, below.

It should be noted that high trans SBR has higher tear strength than SBR-1500. This can be related to strain-induced crystallization in the high trans SBR. It is clear that the vulcanizate properties of high trans SBR approach those of natural rubber.

TABLE XIII

| | Formulations (PHR) | | |
|---|---|---|---|
| | SBR-1500 | Natural Rubber (SMR-5) | High Trans SBR (20% Styrene) |
| Ingredients | Run No.: 48 | 49 | 50 |
| Rubber | 100 | 100 | 100 |
| Antioxidant 2246[a] | 2 | 2 | 4[e] |
| Zinc Oxide | 5 | 5 | 5 |
| Stearic Acid | 3 | 3 | 3 |
| Atlantic Wax | 3 | 3 | — |
| Tackifier 775[b] | 3 | 3 | 3 |
| HAF Carbon Black | 45 | 45 | 42 |
| PHILRICH 5 Oil (Phillips Pet.) | 5 | 5 | 14[f] |
| NOBS[c] | 1.6 | 0.5 | 1.6 |
| TMTM[d] | 0.2 | — | 0.2 |
| CRYSTEX Sulfur[g] (Stauffer Chem.) | 1.3 | 2.5 | 1.3 |
| Cured, min./°C. | 45/142 | 35/142 | 21/142 |

[a]2,2'-methylenebis (4-methyl-6-tert-butylphenol)
[b]octylphenol formaldehyde (non-heat reactive)
[c]2-(morpholino) thiobenzothiazole (American Cyanamid)
[d]tetramethylthiuram monosulfide
[e]2 phr, N—(1,3-dimethylbutyl)-N'—phenyl-p-phenylene diamine and 2 phr, N,N'—Bis(1,4-dimethylpentyl)-p-phenylene diamine
[f]Naphthenic Oil (Circosol 42XH, Sun Oil Co.)
[g]CRYSTEX contains 80% sulfur in mineral oil

TABLE XIV

Comparison of Properties of High Trans SBR of This Invention with SBR-1500 (Emulsion Polymer) and Natural Rubber

| | Run No. | | |
|---|---|---|---|
| | 48 SBR-1500 | 49 Natural Rubber | 50 High Trans SBR |
| Modulus at 100%, MPa | 1.51 | 1.50 | 1.38 |
| Modulus at 300%, MPa | 6.47 | 7.34 | 3.68 |
| Tensile Strength, MPa | 21.94 | 25.23 | 20.13 |
| Elongation, % | 700 | 650 | 770 |
| Hardness, Shore A | 66 | 59 | 63 |
| Tear Strength, Crescent, kN/m | 83 | 123 | 112 |
| Goodrich Heat Buildup (100° C.), ΔT °C. | 32 | 28 | 28 |
| Perm. Set, % (100° C.) | 10.2 | 18.6 | 6.4 |
| DeMattia No. of Flexes × $10^{-3}$ | 100 | 100 | 100 |
| Crack Growth, % | 100 | 41 | 75 |

EXAMPLE 15

To n-butylethyl magnesium (Texas Alkyls, Inc., BEM, a mixture of n-butylethyl magnesium and triethyl aluminum, mole ratio of Mg to Al of 50:1, in heptane) was added cyclohexane and additional triethyl aluminum to give a mole ratio of Mg/Al=4.8 to 1. To the Mg-Al composition was added

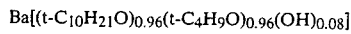

$$Ba[(t-C_{10}H_{21}O)_{0.96}(t-C_4H_9O)_{0.96}(OH)_{0.08}]$$

in toluene to provide a mole ratio of Ba/Mg=0.26. The resulting Ba-Al-Mg catalyst complex was then used to polymerize propylene oxide (PO) at 80° C. to obtain a tacky solid. The polymerization conditions used were as follows:

| PO Grams | Solvents, grams | | | Grams PO Per mM Mg | % Conv. (Hrs). |
|---|---|---|---|---|---|
| | Cyclohexane | Heptane | Toluene | | |
| 40.2 | 8.8 | 3.8 | 19.1 | 10.9 | 40(64) |

The tacky polypropylene oxide solid (14% by weight of total polymer) in the acetone-insoluble fraction (at −15° C.) showed a broad endotherm with crystalline melt peak at 46° C. by DTA and a Tg of −80° C. and exhibited an intrinsic viscosity in toluene at 30° C. of 3.17 dl/g (5% by weight insolubles). A 3/1 ratio of isotactic to syndiotactic placements was found by $^{13}C$ NMR.

EXAMPLE 16

A. To BEM (Texas Alkyls, Inc., a mixture of n-butylethyl magnesium and triethylaluminum having a mole ratio of Mg to Al of 50:1 in heptane) was added additional triethylaluminum to give a BEM mixture with a mole ratio of Mg to Al of 5:1. To the resulting BEM mixture was added a barium salt in toluene prepared according to Example 1(a), above. The mole ratio of Ba to Mg was 0.19. The mixture of the magnesium, aluminum and barium compounds was then charged to a reactor containing hexane and under an argon atmosphere. Butadiene was then charged to the reactor. The ratio of the butadiene to the BEM per se was 17.5 g butadiene per mmole of the BEM. Polymerization was conducted for 43 hours at 50° C. to a conversion of 93%. Polymerization was terminated with methanol.

The resulting polymer exhibited a $\overline{M}n$ by membrane osometry of 34,000 and an intrinsic viscosity in dl/g in toluene at 30° C. of 0.84.

Figure 9:
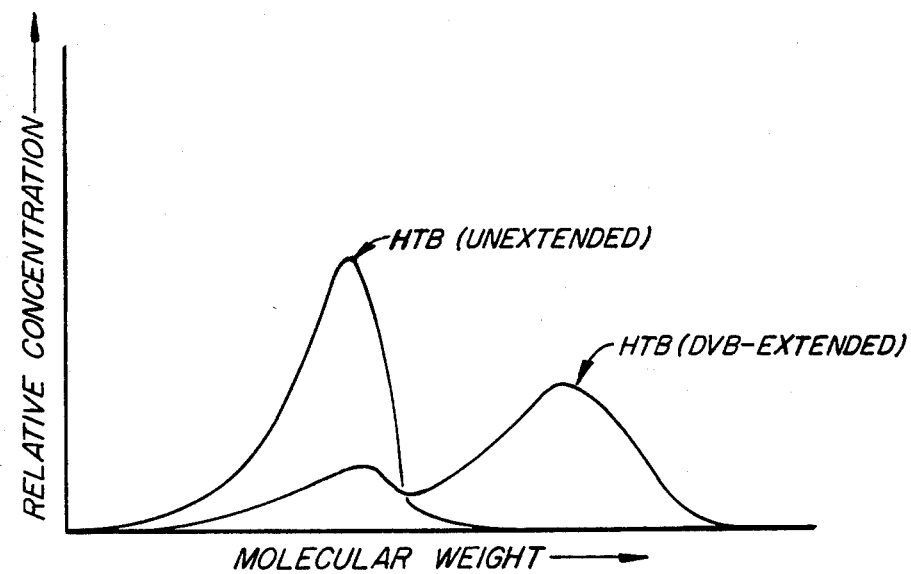
FIG. 9 is a graph showing the effect of chain extension on the molecular weight distribution of a high trans polybutadiene.

B. Run A, above, was repeated except that the ratio of the butadiene to the BEM per se was 18.8 grams of butadiene per mmole of BEM, the conversion of butadiene to homopolybutadiene was 94% (estimated) and the polymerization was not terminated. Thereafter, divinyl benzene (DVB) was added to the reactor containing the solution of the non-terminated polybutadienyl carbanion. The mole ratio of the DVB to the BEM per se was 2.4. The total grams of butadiene added was 17.19 and of DVB was 0.28. Polymerization was then conducted at 60° C. for an additional 19 hours. Polymerization was terminated with methanol. Total polymerization time was 62 hours. The final conversion was 96%. The microstructure of the butadiene segments of the resulting DVB linked polymer was 89% trans, 2% vinyl and 9% cis. The $\overline{M}n$ by membrane osometry was 109,000 and the intrinsic viscosity in dl/g at 30° C. in toluene was 1.87. A comparison of the number-average molecular weight, $\overline{M}n$, of the linear polymer (A.) with that of the DVB-linked polybutadiene (B.) demonstrates the successful preparation of a star polymer having an average of three arms. FIG. 9 shows MWD curves of this DVB-linked polybutadiene and its precursor polybutadiene. It is apparent that a substantial amount of DVB-linked polybutadiene was formed.

EXAMPLE 17

A mixture or complex was prepared by mixing together dibutylmagnesium (in heptane), triethylaluminum (in hexane) and the barium salt of Example 1(a), above (in cyclohexane). The mole ratio of the Mg to the Al was 7.5, and the mole ratio of the Ba to the Mg was 0.17. The Mg-Al-Ba mixture was then charged to a reactor containing cyclohexane and under an argon atmosphere. 32.7 g of styrene were then charged to the reactor (ratio of styrene to Mg was 21.7 g styrene per mmole Mg). Polymerization was conducted for 66 hours at a temperature of 60° C. to a conversion of 77% to polystyrene (as determined by sampling).

Then 48 grams of butadiene were added to the reactor containing the solution containing the non-terminated polystyryl carbanion and 7.5 g of styrene monomer. The ratio of Bd+Sty to Mg was 53.6 g of Bd+Sty per mmole of Mg. The polystyryl carbanion was used to initiate the copolymerizaton of butadiene with styrene. Polymerization was then continued at 60° C. for an additional 96 hours to provide a non-terminated poly [styrene-b-(styrene-co-butadiene)] block copolymer. By sampling conversion was determined to be 90.6%.

Thereafter, 0.64 gram of divinyl benzene was added to the reactor to react with the non-terminated poly[styrene-b-(styrene-co-butadiene)]. The mole ratio of DVB/Mg was 3.2 (ratio of monomers to Mg was total of 53.95 grams of Sty+Bd+DVB per mmole of Mg). Polymerization was then conducted at 60° C. for an additional 24 hours for a grand total of 186 hours. Polymerization was terminated with methanol, and the conversion was found to be 100%. The resulting product contained 42 wt. % styrene and the microstructure of the butadiene units was 84% trans, 6% vinyl and 10% cis.

Figure 10:
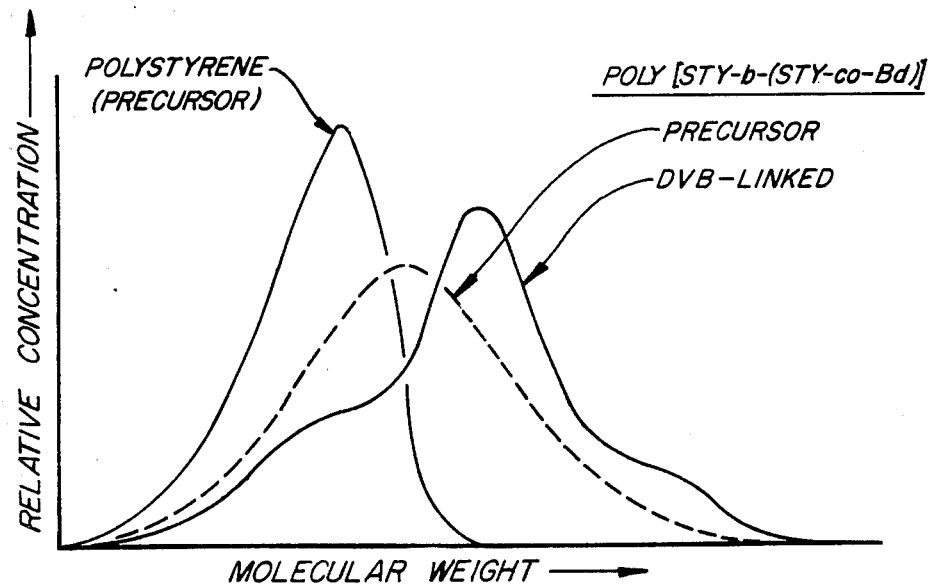
FIG. 10 is a graph showing the gel permeation chromatograms of a divinyl benzene-linked poly[styrene-b-(styrene-co-butadiene)] diblock copolymer and its precursors and FIG. 11 is a graph of a stress-strain curve of a divinyl benzene linked styrene-butadiene diblock polymer (40% styrene) prepared with the Mg-Al-Ba catalyst of the present invention.
Figure 11:
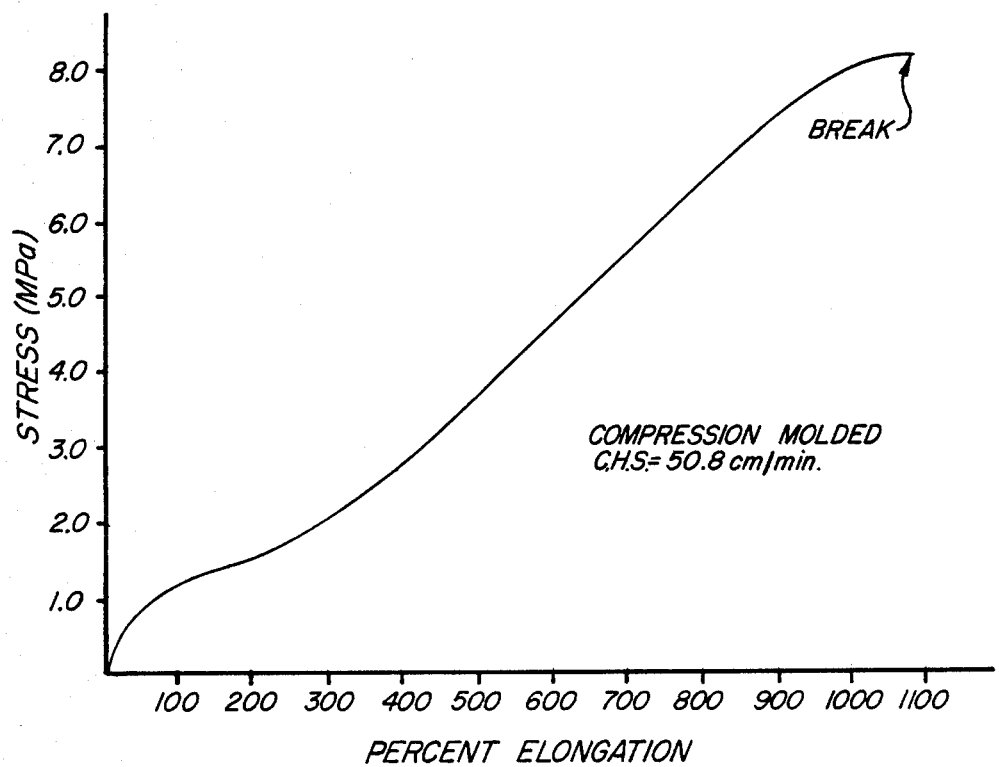

FIG. 10 shows GPC chromatograms of the DVB-linked poly[Sty-b-(Sty-co-Bd)] and the corresponding two linear precursors. The relative shapes of the curves in FIG. 10 demonstrate both an increase in the amount of high molecular weight polymer as well as an increase in the molecular weight as a result of the reaction of active chain ends with DVB. It is apparent that a certain fraction of unlinked polystyrene and poly(Sty-co-Bd) is present along with star polymer. However, the DVB linking reaction produces a sufficient amount of "reinforcing" polystyrene domain structure to provide elastomer strength. This can be seen by the shape of the stress-strain curve (FIG. 11) for the compression molded sample. A stress value of 8.3 MPa (1200 psi) at break (1100% elongation) was obtained for this DVB-liked poly[Sty-b-(Sty-co-Bd] material.

We claim:

1. The method which comprises polymerizing under inert conditions in a hydrocarbon solvent at a temperature of from about 0° to 150° C. a polymerizable monomer selected from the group consisting of (A) butadiene-1,3 and (B) at least 50% by weight of butadiene-1,3 and the balance essentially styrene with a catalyst in a minor effective amount sufficient to polymerize said monomer to obtain high trans homopolymers, random copolymers or block copolymers, said catalyst comprising (1) an alcoholate selected from the group consisting of barium alcoholate, calcium alcoholate and strontium alcoholate and mixtures thereof, (2) an organoaluminum compound selected from the group consisting of alkyl and cycloalkyl aluminum compounds and mixtures of the same in which the organic moieties have from 1 to 20 carbon atoms and (3) an organomagnesium compound selected from the group consisting of alkyl and cycloalkyl magnesium compounds and mixtures of the same in which the organic moieties have from 1 to 20 carbon atoms, where the mol ratio computed as metal of barium, calcium and/or strontium to magnesium is from about 1:10 to 1:2 and where the mol ratio computed as metal of magnesium to aluminum is from about 105:1 to 1.5:1 and at about 85% conversion of said monomer to said polymer adding from about 0.01 to 10.0 parts by weight of a chain extender or branching compound selected from the group consisting of divinyl aromatic and trivinyl aromatic compounds per 100 parts by weight of said monomer initially charged to obtain a chain extended, branched or star polymer.

2. The method according to claim 1 where said chain extender or branching compound is divinylbenzene.

3. The method according to claim 1 additionally adding to or copolymerizing with said chain extended, branched or star polymer a copolymerizable polar material selected from the group consisting of the acrylates, the alkacrylates, the nitriles, the epoxides, the siloxanes and the lactones in an amount up to about 30 parts by weight based on 100 parts by weight of said chain extended, branched or star polymer.

4. The method according to claim 3 where said chain extender or branching compound is divinyl benzene, said polar material is methyl methacrylate and M is barium.

5. The method according to claim 2 where said polymerizable monomer is (A).

6. The method according to claim 2 where said first named copolymer comprises a random copolymer of butadiene-1,3 and styrene.

7. The method according to claim 2 where said first named copolymer comprises a block copolymer of butadiene-1,3 and styrene.

8. The method according to claim 2 where said first named copolymer comprises a poly(styrene-b-(styrene-co-butadiene-1,3) block copolymer.

9. The method which comprises polymerizing under inert conditions in a hydrocarbon solvent at a temperature of from about 30° to 100° C. a polymerizable monomer selected from the group consisting of (A) butadiene-1,3 and (B) at least 50% by weight of butadiene-1,3 and the balance essentially styrene with a catalyst composition in a minor effective amount sufficient to polymerize said monomer to obtain high trans homopolymers, random copolymers or block copolymers, said catalyst composition comprising (1) at least one of

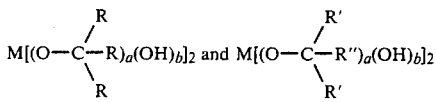

where the mol ratio of a to b is from about 100:0 to 80:20, where M is at least one metal selected from the group consisting of Ba, Ca and Sr, where R is selected from the group consisting of alkyl and cycloalkyl radicals of from 1 to 6 carbon atoms which may be the same or different, where R' is an alkyl radical of from 1 to 4 carbon atoms which may be the same or different and where R" is a hydrocarbon radical having a molecular weight of from about 250 to 5,000, (2) $R_3^{III}Al$ where $R^{III}$ is selected from the group consisting of alkyl and cycloalkyl radicals of from 1 to 20 carbon atoms which may be the same or different and (3) $R_2^{IV}Mg$ where $R^{IV}$ is selected from the group consisting of alkyl and cycloalkyl radicals of from 1 to 20 carbon atoms which may be the same or different, where the mol ratio of magnesium to aluminum of (2) and (3) computed as metal is from about 105:1 to 1.5:1 and where the mol ratio of M to magnesium of (1) and (3) computed as metal is from about 1:10 to 1:2 and at about 85% conversion of said monomer to said polymers adding from about 0.01 to 10.0 parts by weight of a chain extender or branching compound selected from the group consisting of divinyl aromatic and trivinyl aromatic compounds per 100 parts by weight of said monomer initially charged to obtain a chain extended, branched or star polymer.

10. The method according to claim 9 where said chain extender or branching compound is divinylbenzene.

11. The method according to claim 9 additionally adding to or copolymerizing with said chain extended, branched or star polymer a copolymerizable polar material selected from the group consisting of the acrylates, the alkacrylates, the nitriles, the epoxides, the siloxanes and the lactones in an amount up to about 30 parts by weight based on 100 parts by weight of said chain extended, branched or star polymer.

12. The method according to claim 11 where said chain extender or branching compound is divinyl benzene, said polar material is methyl methacrylate and M is barium.

13. The method according to claim 10 where said polymerizable monomer is (A).

14. The method according to claim 10 where said first named copolymer comprises a random copolymer of butadiene-1,3 and styrene.

15. The method according to claim 10 where said first named copolymer comprises a block copolymer of butadiene-1,3 and styrene.

16. The method according to claim 10 where said first named copolymer comprises a poly(styrene-b-(styrene-co-butadiene-1,3) block copolymer.

17. The product produced by the method of claim 1.
18. The product produced by the method of claim 2.
19. The product produced by the method of claim 3.
20. The product produced by the method of claim 4.
21. The product produced by the method of claim 5.
22. The product produced by the method of claim 6.
23. The product produced by the method of claim 7.
24. The product produced by the method of claim 8.
25. The product produced by the method of claim 9.
26. The product produced by the method of claim 10.
27. The product produced by the method of claim 11.
28. The product produced by the method of claim 12.
29. The product produced by the method of claim 13.
30. The product produced by the method of claim 14.
31. The product produced by the method of claim 15.
32. The product produced by the method of claim 16.

* * * * *